United States Patent
Sakauchi et al.

(10) Patent No.: US 8,917,994 B2
(45) Date of Patent: Dec. 23, 2014

(54) WAVELENGTH PATH MULTIPLEXING AND DEMULTIPLEXING OPTICAL TRANSMISSION APPARATUS

(75) Inventors: Masahiro Sakauchi, Tokyo (JP); Shigeru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 583 days.

(21) Appl. No.: 13/262,185

(22) PCT Filed: Mar. 25, 2010

(86) PCT No.: PCT/JP2010/055170
§ 371 (c)(1),
(2), (4) Date: Sep. 29, 2011

(87) PCT Pub. No.: WO2010/113740
PCT Pub. Date: Oct. 7, 2010

(65) Prior Publication Data
US 2012/0033969 A1 Feb. 9, 2012

(30) Foreign Application Priority Data
Mar. 30, 2009 (JP) ................................ 2009-082879

(51) Int. Cl.
*H04J 14/00* (2006.01)
*G02B 6/293* (2006.01)
*H04Q 11/00* (2006.01)
*H04J 14/02* (2006.01)
*G02B 6/35* (2006.01)

(52) U.S. Cl.
CPC .......... *G02B 6/2932* (2013.01); *G02B 6/29322* (2013.01); *G02B 6/29338* (2013.01); *G02B 6/29353* (2013.01); *G02B 6/29383* (2013.01); *H04Q 11/0005* (2013.01); *H04Q 11/0062* (2013.01); *H04J 14/0267* (2013.01); *H04J 14/0269* (2013.01); *G02B 6/356* (2013.01); *H04Q 2011/0016* (2013.01); *H04Q 2011/003* (2013.01); *H04Q 2011/0035* (2013.01); *H04Q 2011/0058* (2013.01)

USPC ........................................................... 398/83

(58) Field of Classification Search
CPC .................................................. H04J 14/0206
See application file for complete search history.

(56) References Cited

U.S. PATENT DOCUMENTS

2002/0044718 A1 4/2002 Nishi et al.
2002/0118913 A1* 8/2002 Maeda et al. ................... 385/24

FOREIGN PATENT DOCUMENTS

| JP | 11-174253 | 7/1999 |
|----|-----------|--------|
| JP | 2002-124918 | 4/2002 |
| JP | 2002-262317 | 9/2002 |
| JP | 2003-101484 | 4/2003 |

(Continued)

OTHER PUBLICATIONS

International Search Report, PCT/JP2010/055170, Jun. 15, 2010.

*Primary Examiner* — Danny Leung
(74) *Attorney, Agent, or Firm* — Young & Thompson

(57) ABSTRACT

A sending apparatus includes: a wavelength path multiplexing part; a sending wavelength path selection part; and an optical transmitter having optical sending parts. The wavelength path multiplexing part includes: sending wavelength path demultiplexing ports; and sending wavelength multiplexing ports connected thereto. The sending wavelength path multiplexing ports are connected to optical transmission paths respectively. The sending wavelength path selection part includes a wavelength multiplexing parts which multiplexing a set combination of optical signals among the optical signals inputted to the sending input ports and outputs it to any of the sending output ports. In the wavelength path sending or receiving by the wavelength path multiplexing/demultiplexing optical transmission apparatus, a non-selectable combination between a wavelength and a route can be avoided.

16 Claims, 24 Drawing Sheets

(56) References Cited

FOREIGN PATENT DOCUMENTS

| JP | 3533316 | 5/2004 |
| JP | 2005-352515 | 12/2005 |
| JP | 2006-197489 | 7/2006 |
| WO | WO 2009/022478 | 2/2009 |

* cited by examiner

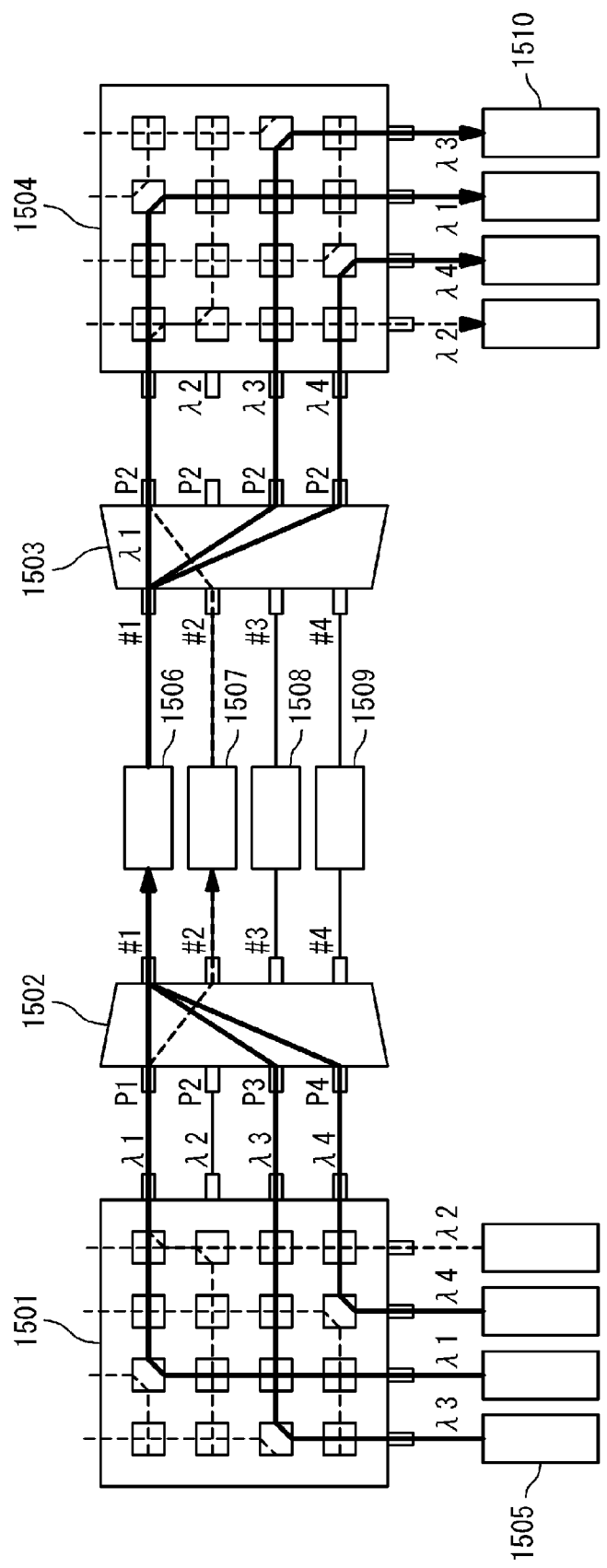

|    | λ1 | λ2 | λ3 | λ4 |
|----|----|----|----|----|
| P1 | #1 | #2 | #3 | #4 |
| P2 | #4 | #1 | #2 | #3 |
| P3 | #3 | #4 | #1 | #2 |
| P4 | #2 | #3 | #4 | #1 |

Cross state

Bar state

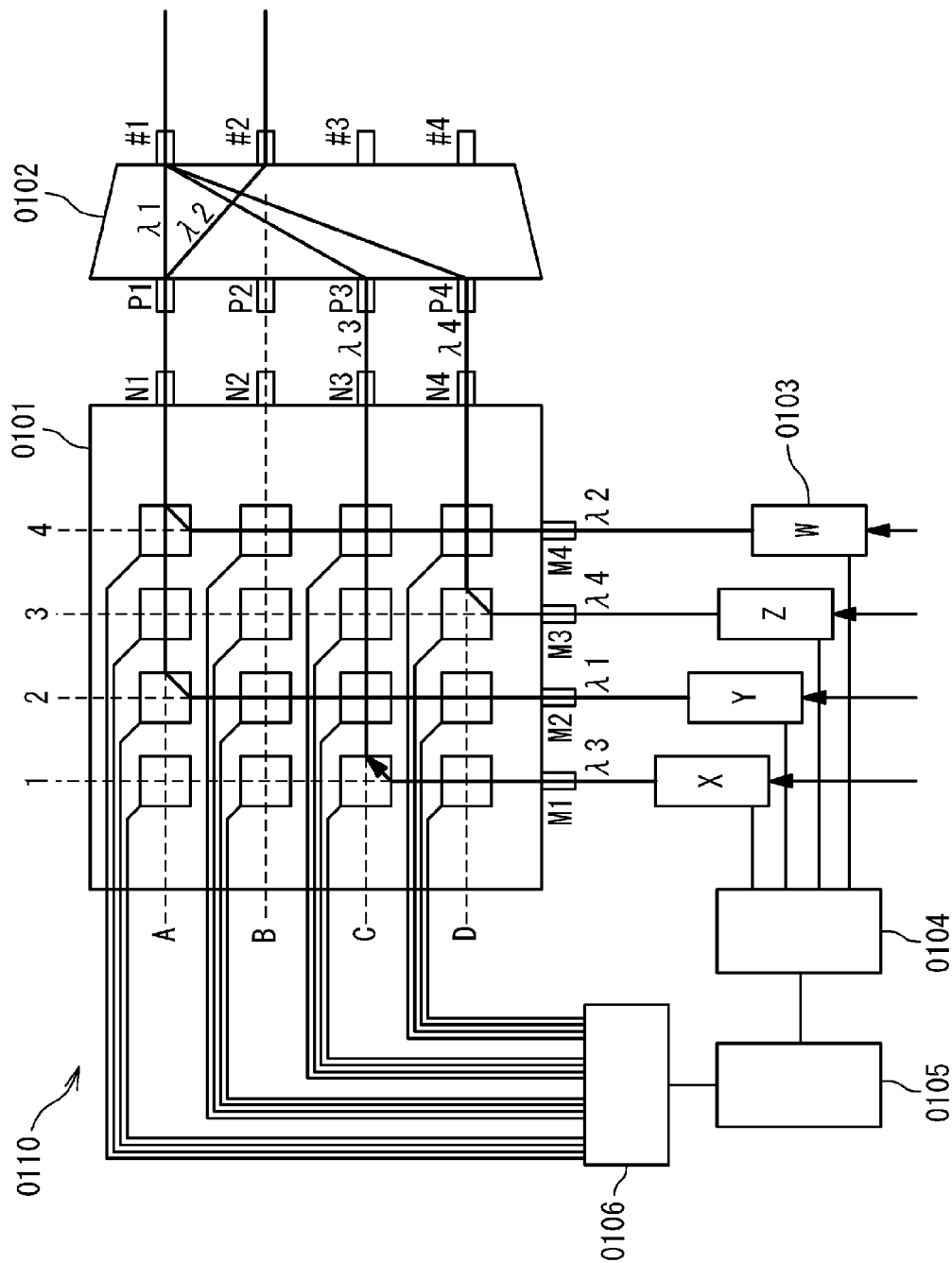

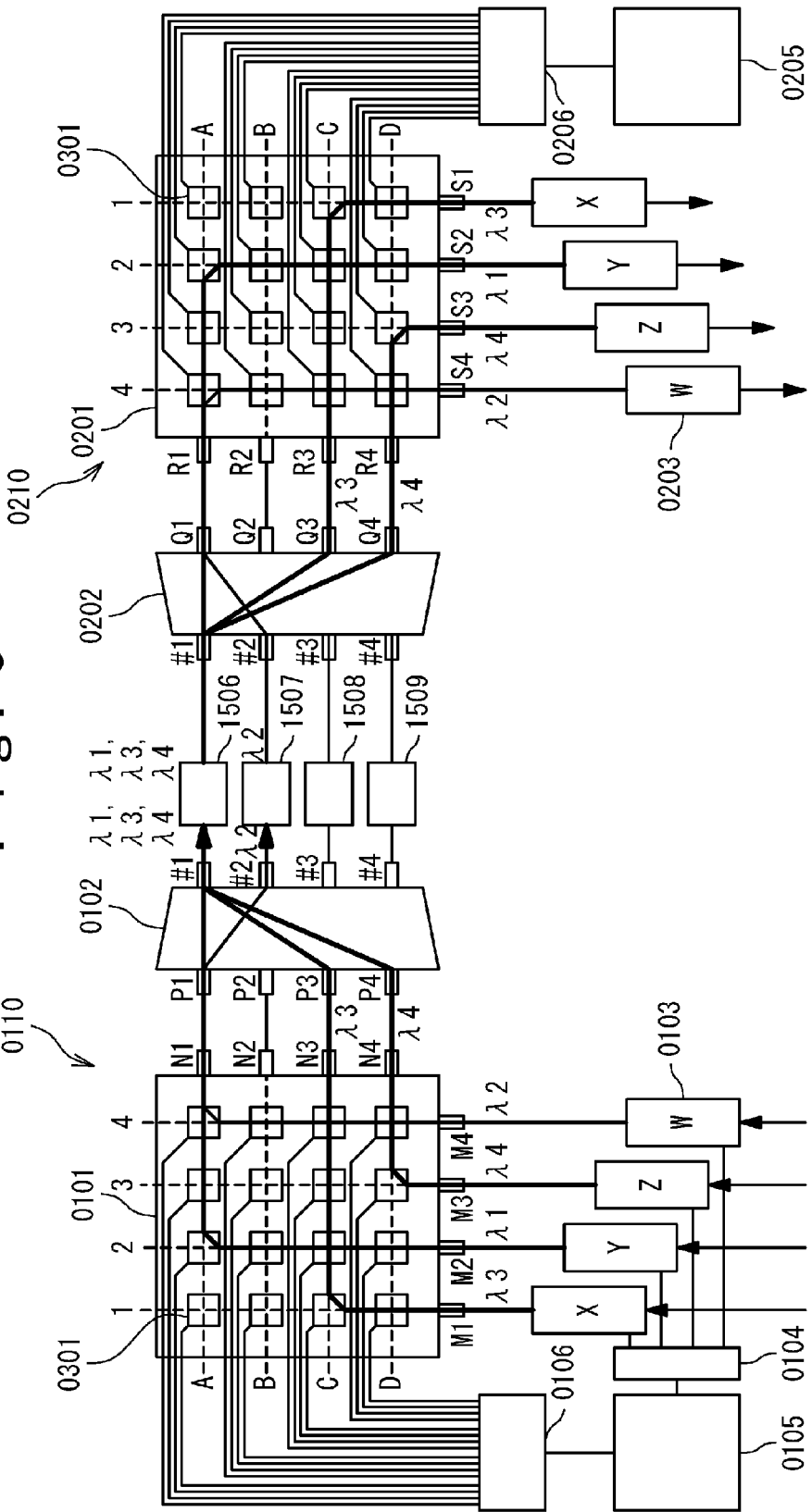

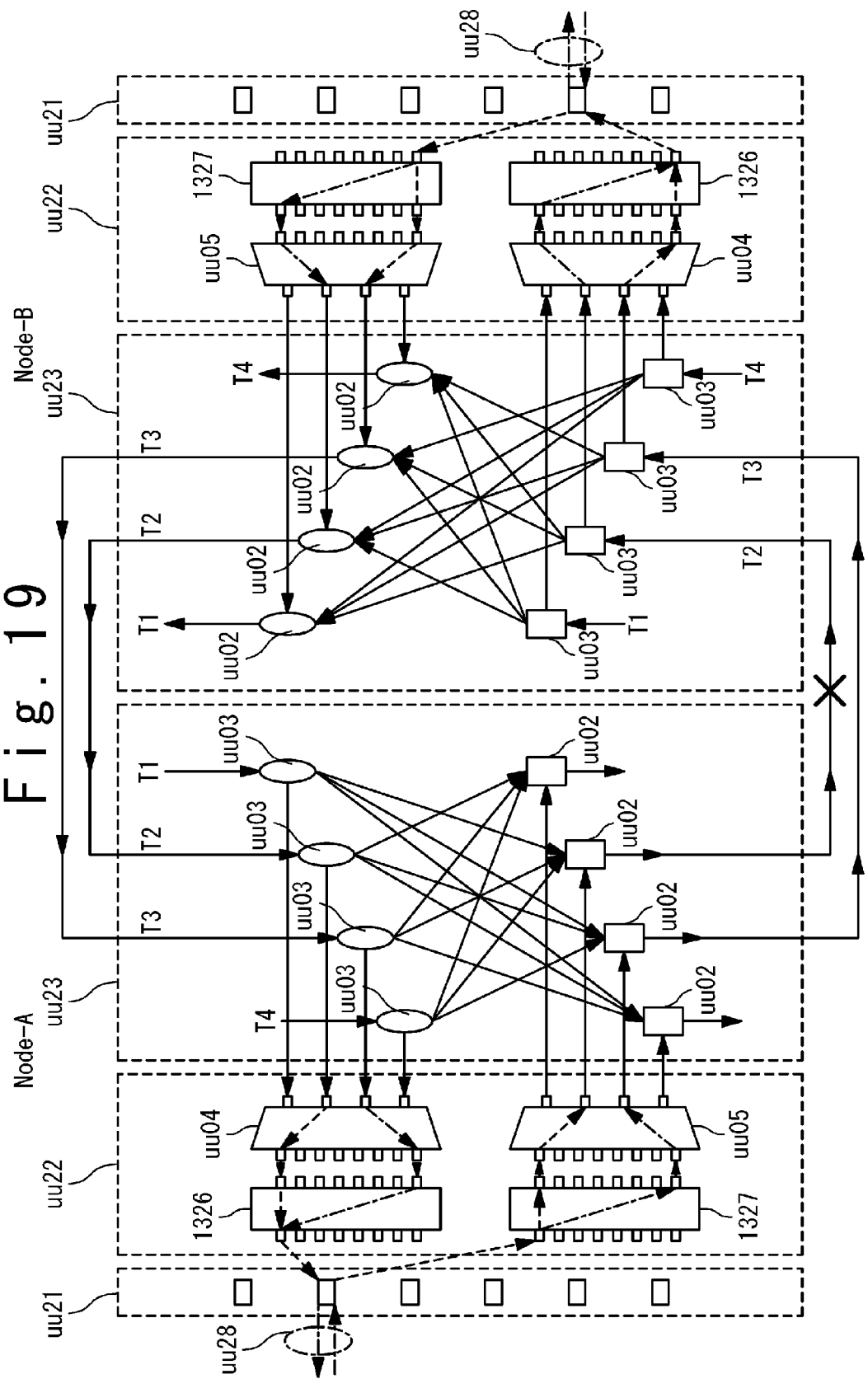

WAVELENGTH PATH MULTIPLEXING AND DEMULTIPLEXING OPTICAL TRANSMISSION APPARATUS

TECHNICAL FIELD

The present invention relates to an optical communication network for performing a wavelength multiplexing and demultiplexing.

BACKGROUND ART

In the optical communication network, the WDM (Wavelength Division Multiplexing) technique has become widely used. Subsequent to the introduction of the WDM to the large capacity connection to the core network by Point-to-Point, the application of the WDM to the metro-local network and of the ROADM (Reconfigurable Optical Add/Drop Multiplexer) has been progressed. With the increase of the capacity of the wavelength path, more and more services will become multiplexed.

When the multiplexing degree is increased, a trouble occurred in the photonic physical layer has great influences on a plurality of upper service layers. Further, with the progress of the introduction of the ROADM, it is required to enhance the functions and the reliability of and decrease the cost for the node of the wavelength path network.

Patent Literature 1 (Japanese Patent Number 3533316) is a conventional technique of the enhancement of the reliability of the wavelength path network. FIG. 1 of Patent Literature 1 shows the basic configuration of a wavelength path multiplexing and demultiplexing optical transmission apparatus and an example of the switching when a trouble occurs. In this literature, FIG. 1(b) shows a trouble of the transmission path 52-1, and FIG. 1(b) shows a switching operation corresponding to the trouble of the optical transmitter 12-1.

In the trouble of the optical transmitter, the signal selector circuit 11 is switched such that the optical transmitter prepared for a redundant system is operated as the working system, and the sending wavelength of the optical transmitter 12-1 is switched to the wavelength of the wavelength multiplexing part 14 to send to the transmission path 52-1. Further, in the receiving side, the wavelength single outputted by the wavelength demultiplexing part 21 is received by the optical receiver 23-1 prepared as a redundant system. After switching the signal selector circuit 24 and cutting off the communication between switching operations, the communication before the occurrence of the trouble can be continued.

In the trouble of the transmission path 52-1, the sending wavelengths of the optical transmitters 12-1 to 12-m being the working system are respectively switched such that the output signal of the wavelength multiplexing part 14 is outputted to the transmission path 52-2 of a redundant system. The wavelength demultiplexing part 21, which has the same wavelength input and output characteristics with the wavelength multiplexing part 14, outputs the output wavelength signal to the optical receivers 22-1 to 22-m being the working system respectively, and after the communication is cut off between the switching operations, the communication before the occurrence of the trouble can be continued.

In the example of the configuration shown in FIG. 1 of Patent Literature 1, a case where two transmission paths which are the working system and the redundant system is shown. However, it is also possible to use a plurality of transmission paths. Further, the network can be extended by the optical bifurcation insertion node as shown in FIG. 9 of Patent Literature 1.

FIG. 1A shows a configuration of a wavelength path multiplexing and demultiplexing optical transmission apparatus according to a reference example for the present invention. In the configuration of the wavelength path multiplexing and demultiplexing optical transmission apparatus according to Patent Literature 1, a signal selector circuit is provided between the wavelength multiplexing/demultiplexing part and the optical transmitter/receiver as shown in FIGS. 3(b), 5(c), and 8(c). The sending side and the receiving side are connected by the wavelength signal via three or more transmission paths or a network (the routes 1506 to 1509).

The optical signals of the plurality of wavelengths $\lambda 1$ to $\lambda 4$ sent from the sending function part 1505 of the transponder is outputted to the wavelength multiplexing part output port #1 by the wavelength path multiplexing part 1502 via the optical matrix switch 1501, and sent to the receiving side via a transmission path or the network 1506. The optical signal inputted to the receiving side is received by the transponder receiving function part 1510 via the wavelength path demultiplexing part 1503 and the optical matrix switch 15804.

When a trouble occurs in the wavelength path multiplexing and demultiplexing transmission apparatus having the above configuration, it is required to simultaneously switch the transmission paths of the working system to those of the redundant system for coping with the trouble in a transmission path and perform a switching operation for coping with the trouble in the optical transmitter and the optical receiver. Furthermore, the operation of sending and receiving any wavelength signal for any transmission path or network is required.

Japanese Patent Application Publications JP-A-Heisei, 11-174253 and JP-P2006-197489A are other examples of conventional techniques relating to the optical wavelength multiplexing and demultiplexing system.

CITATION LIST

Patent Literature

[PTL1] Japanese Patent Number 3533316
[PTL2] Japanese Patent Application Publication JP-A-Heisei, 11-174253
[PTL3] Japanese Patent Application Publication JP-P2006-197489A

SUMMARY OF INVENTION

However, in the configuration of the reference example shown in FIG. 1A, there is a problem that a combination of the wavelength and the route which cannot be selected exists. The reason is explained below.

FIG. 2A shows the wavelength path multiplexing part 1502 in the reference example. The wavelength path multiplexing part 1502 includes: demultiplexing ports (the sending wavelength path demultiplexing ports) P1 to P4 and multiplexing ports (the wavelength path multiplexing ports) #1 to #4. Each of the multiplexing ports #1 to #4 is connected to one route. The wavelength path multiplexing part 1502 is able to multiplex an appropriate combination of the optical signals respectively inputted to the demultiplexing ports P1 to P4 and output the multiplexed signal to a certain determined node among the multiplexing ports #1 to #4. Further, the wavelength path multiplexing part 1502 functions as a wavelength demultiplexing part which demultiplexes the multiplexed optical signal inputted to any of the multiplexing ports #1 to #4 and outputs them to the ports of a determined combination among the demultiplexing ports P1 to P4 respectively.

FIG. 2B shows a correspondence relation between the multiplexing ports P1 to P4, and the demultiplexing ports #1 to #4 which are the connection destinations of the optical paths when the optical signal wavelengths λ1 to λ4 are respectively inputted to the multiplexing ports P1 to P4. This correspondence relation is set based on the control signal transmitted by the sending apparatus control part.

FIG. 3A shows an optical matrix switch of 4×4. The optical matrix switch 1501 includes a plurality of crossbar switch elements 1701 disposed in an array arrangement. Each crossbar switch element 1701 has input/output ports TA, TB along a first path and input/output ports TC, TD along a second path. The crossbar element 1701 is alternatively set to one of the cross state and the bar state in response to the control signal transmitted by the sending apparatus control part.

FIG. 3B shows the optical path of the crossbar switch element 1701 at the cross state. In the cross state, the input/output ports TA and TB on the first path are connected, the input/output ports TC and TD on the second path are connected, and the first path and the second path are separated not to interfere to each other. FIG. 3C shows the optical path of the crossbar switch element 1701 at the bar state. In the bar state, the input/output ports TA and TD are connected, and the TB and TC are connected. The first path and the second path are cut off respectively. The optical matrix switch 1501 is constituted by disposing the crossbar switch elements 1701 operated as above in a matrix arrangement and connecting them as shown in FIG. 3A. Any port of the one side ports M1 to M4 of the optical matrix switch 1501 can be connected to any port of the other ports N1 to N4 (non-blocking construction).

The wavelength path multiplexing and demultiplexing optical transmission apparatus shown in FIG. 1A can be constructed by using the wavelength path multiplexing part 1502, the wavelength path demultiplexing part 1503 having the same construction with the wavelength path multiplexing part 1502, the optical matrix switch 1501 shown in FIG. 3A, and the optical matrix switch 1504 having the same construction with the optical matrix switch 1501. In this wavelength path multiplexing and demultiplexing optical transmission apparatus, it is assumed to perform a control to switch the optical signal of the wavelength λ2 from the route 1506 connected to the demultiplexing port #1 to the route 1507 connected to the demultiplexing port #2 as shown in FIG. 1B. Because the wavelength path multiplexing part 1502 and the wavelength path demultiplexing part 1503 have the correspondence relations shown in FIG. 2B between the multiplexing ports P1 to P4 and the demultiplexing ports #1 to #4 respectively, it is required to switch the optical matrix switch 1501 such that the optical signal of the wavelength λ2 is inputted to the multiplexing port P1 of the wavelength path multiplexing part 1502. However, such an operation is not possible, because the multiplexing port P1 is already used as a path to output the optical signal of the wavelength λ1 to the demultiplexing port #1 connected to the route 1506.

As explained above, in the construction where a unique wavelength is applied to the input/output ports of the wavelength path multiplexing part and the wavelength path demultiplexing part, a combination of the wavelength and the route which cannot be selected exists.

According to an aspect of the present invention, a wavelength path multiplexing and demultiplexing optical transmission apparatus includes: a sending apparatus; and a receiving apparatus. The sending apparatus includes: a wavelength path multiplexing part; sending wavelength path selection part; and an optical sending apparatus comprising a plurality of optical sending parts configured to send a plurality of optical signals having different wavelength from each other respectively. The wavelength path multiplexing part includes: a plurality of sending wavelength path demultiplexing ports; and a plurality of sending wavelength path multiplexing ports with which a first correspondence relation indicating respective optical connections to the plurality of sending wavelength path demultiplexing ports are set. The plurality of sending wavelength path multiplexing ports are respectively connected to a plurality of optical transmission paths. The sending wavelength path selection part includes: a plurality of sending input ports configured to respectively input a plurality of optical signals transmitted by the optical sending apparatus; a plurality of sending output ports configured to respectively output optical signals to the plurality of sending wavelength path demultiplexing port; and a wavelength multiplexing part configured to multiplex a set combination of a plurality of optical signals which input to the plurality of sending wavelength path demultiplexing ports to output to the plurality of sending output ports. The receiving apparatus includes: a wavelength path demultiplexing part; a receiving wavelength path selection part; and an optical receiving apparatus having a plurality of optical receiving part configured to respectively receive a plurality of optical signals having different wavelengths to each other. The wavelength path demultiplexing part includes: a plurality of receiving wavelength path multiplexing ports respectively connected to the plurality of optical transmission paths; and a plurality of receiving wavelength path demultiplexing port with which a second correspondence relation indicating respective optical connections to the plurality of receiving wavelength path multiplexing ports are set. The receiving wavelength path selection part includes: a plurality of receiving input ports configured to respectively input a plurality of optical signals outputted by the plurality of receiving wavelength path demultiplexing ports; a plurality of receiving output ports configured to respectively output a plurality of optical signals to the optical receiving apparatus; and a wave length demultiplexing part configured to demultiplex a multiplexed optical signal among a plurality of optical signals respectively input to the plurality of receiving input ports to output to any of the plurality of receiving output ports.

According to an aspect of the present invention, a wavelength multiplexing optical transmission apparatus includes: a wavelength path multiplexing part; sending wavelength path selection part; and an optical sending apparatus comprising a plurality of optical sending parts configured to send a plurality of optical signals having different wavelength from each other respectively. The wavelength path multiplexing part includes: a plurality of sending wavelength path demultiplexing ports; and a plurality of sending wavelength path multiplexing ports with which a first correspondence relation indicating respective optical connections to the plurality of sending wavelength path demultiplexing ports are set. The plurality of sending wavelength path multiplexing ports are respectively connected to a plurality of optical transmission paths. The sending wavelength path selection part includes: a plurality of sending input ports configured to respectively input a plurality of optical signals transmitted by the optical sending apparatus; a plurality of sending output ports configured to respectively output optical signals to the plurality of sending wavelength path demultiplexing port; and a wavelength multiplexing part configured to multiplex a set combination of a plurality of optical signals which input to the plurality of sending wavelength path demultiplexing ports to output to the plurality of sending output ports.

According to an aspect of the present invention, a wavelength path demultiplexing optical transmission apparatus includes: a wavelength path demultiplexing part; a receiving wavelength path selection part; and an optical receiving apparatus having a plurality of optical receiving part configured to respectively receive a plurality of optical signals having different wavelengths to each other. The wavelength path demultiplexing part includes: a plurality of receiving wavelength path multiplexing ports respectively connected to the plurality of optical transmission paths; and a plurality of receiving wavelength path demultiplexing port with which a second correspondence relation indicating respective optical connections to the plurality of receiving wavelength path multiplexing ports are set. The receiving wavelength path selection part includes: a plurality of receiving input ports configured to respectively input a plurality of optical signals outputted by the plurality of receiving wavelength path demultiplexing ports; a plurality of receiving output ports configured to respectively output a plurality of optical signals to the optical receiving apparatus; and a wavelength demultiplexing part configured to demultiplex a multiplexed optical signal among a plurality of optical signals respectively input to the plurality of receiving input ports to output to any of the plurality of receiving output ports.

According to the present invention, regarding the wavelength path for sending and receiving by the wavelength path multiplexing and demultiplexing optical transmission apparatus, the combination of the wavelength and the route which cannot be selected is able to be avoided.

BRIEF DESCRIPTION OF DRAWINGS

The above object, other objects, effects, and characteristics of the present invention are made clear from the description of exemplary embodiments and the accompanying drawings, in which:

FIG. 1B shows a configuration of a wavelength path multiplexing and demultiplexing optical transmission apparatus;

FIG. 4 shows a sending apparatus of the wavelength path multiplexing and demultiplexing optical transmission apparatus;

FIG. 5 shows the wavelength path multiplexing and demultiplexing optical transmission apparatus;

FIG. 19 shows a wavelength path multiplexing and demultiplexing optical transmission apparatus.

DESCRIPTION OF EMBODIMENTS

A First Exemplary Embodiment

Next, a first exemplary embodiment of the present invention is explained in detail with reference to the accompanying drawings. FIG. 4 shows a sending apparatus 0110 of a wavelength path multiplexing and demultiplexing optical transmission apparatus according to the present exemplary embodiment. FIG. 5 shows a wavelength path multiplexing and demultiplexing optical transmission apparatus which includes a sending apparatus 0110 and a receiving apparatus 0210 according to the present exemplary embodiment. The sending apparatus 0110 of the wavelength path multiplexing and demultiplexing optical transmission apparatus includes: a sending wavelength path selection part 0101; a wavelength path multiplexing part 0102; an optical sending part 0103 being a transponder optical transmitter; an optical sending wavelength set part 0104; a sending apparatus control part 0105; and a selection wavelength control circuit 0106.

Figure 6A:
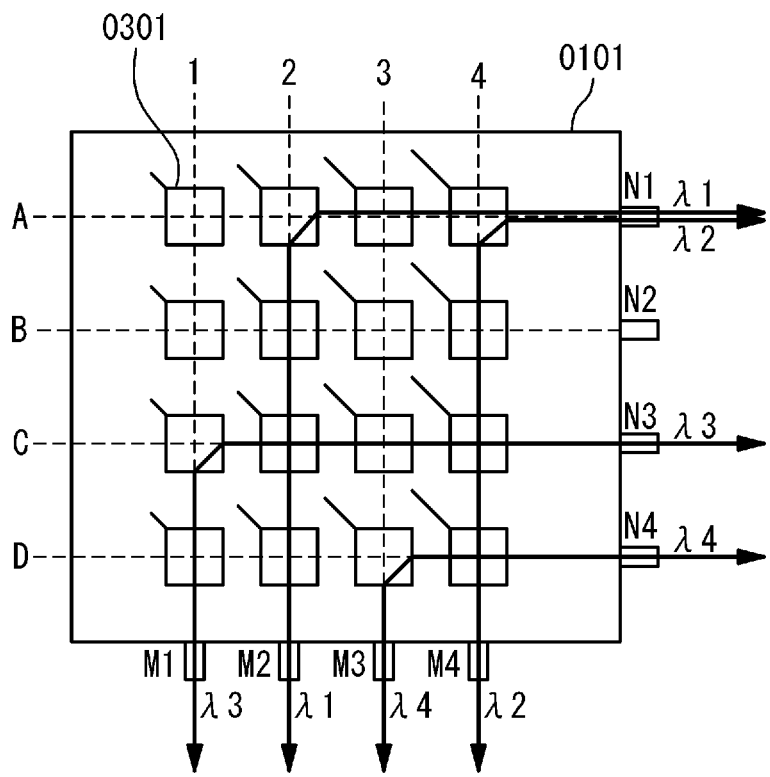
FIG. 6A shows a configuration of the sending wavelength path selection part.
Figure 6B:
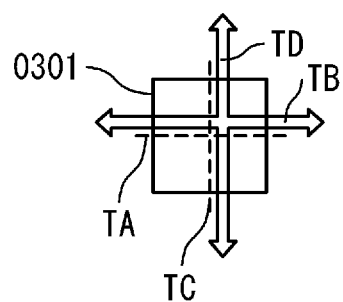
FIG. 6B shows the optical path of the wavelength selection multiplexing and demultiplexing element at the cross state.
Figure 6C:
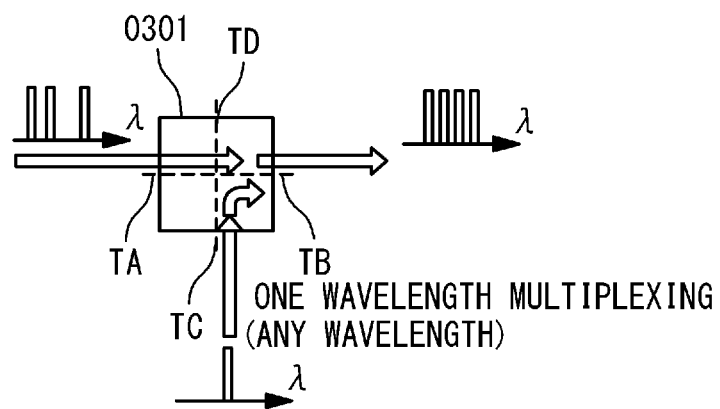
FIG. 6C shows the optical path of the wavelength selection multiplexing and demultiplexing element at the add state.
Figure 6D:
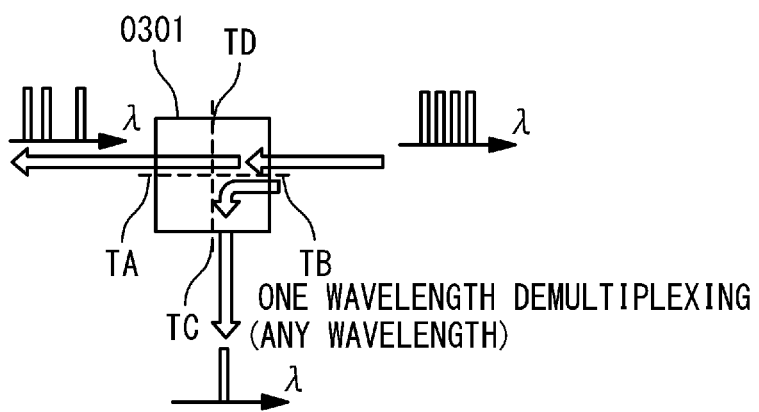
FIG. 6D shows the optical path of the wavelength selection multiplexing and demultiplexing element at the drop state.

FIG. 6A shows a configuration of the sending wavelength path selection part 0101. The sending wavelength path selection part 0101 includes a plurality of wavelength selection multiplexing and demultiplexing elements 0301 which are disposed in a matrix (array) arrangement and connected to each other to form a grid. Each wavelength selection multiplexing and demultiplexing element 0301 has input/output ports TA, TB along a first path and input/output ports TC, TD along a second path. The wavelength selection multiplexing and demultiplexing element 0301 is set to one of the modes of the cross state, the add state (multiplexing state), and the drop state (demultiplexing state) alternatively in response to a control signal. FIG. 6B shows the optical path of the wavelength selection multiplexing and demultiplexing element 0301 at the cross state. In the cross state, the input/output ports TA and TB on the first path are connected, the input/output ports TC and TD on the second path are connected, and the first path and the second path are separated. FIG. 6C shows the optical path of the wavelength selection multiplexing and demultiplexing element 0301 at the add state. In the add state, the input/output ports TA and TB on the first path are connected. Further, an optical signal inputted from the input/output port TC and having any wavelength indicated by a control signal is added to the first path and outputted from the input/output port TB. FIG. 6D shows the optical path of the wavelength selection multiplexing and demultiplexing element 0301 at the drop state. In the drop state, the input/output ports TA and TB on the first path are connected. However, an optical signal among the optical signals inputted from the input/output port TB on the first path and having any wavelength indicated by a control signal is not outputted from the input/output port TA and is dropped to the second path and outputted from the input/output port TC. By the above-explained operation, the wavelength selection multiplexing and demultiplexing element 0301 is able to multiplex or demultiplex an optical signal of any one wavelength to/from a WDM signal wavelength group passing the first path.

Figure 1A:
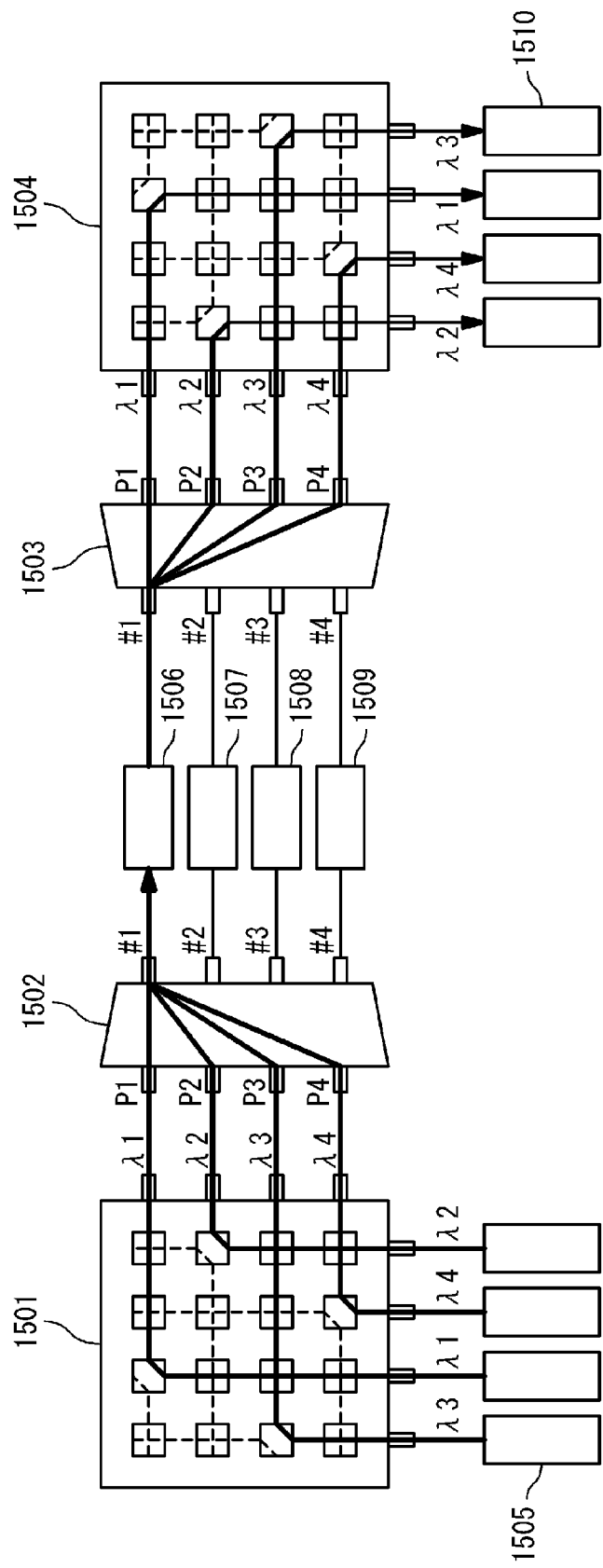
FIG. 1A shows a configuration of a wavelength path multiplexing and demultiplexing optical transmission apparatus.
Figures 2A, 2B:
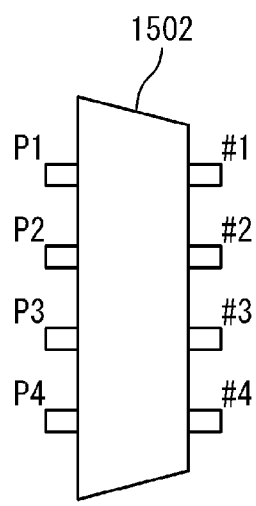
FIG. 2A shows a wavelength path multiplexing part.
FIG. 2B shows a correspondence table between the demultiplexing ports and the multiplexing ports of the wavelength path multiplexing part.
Figure 3A:
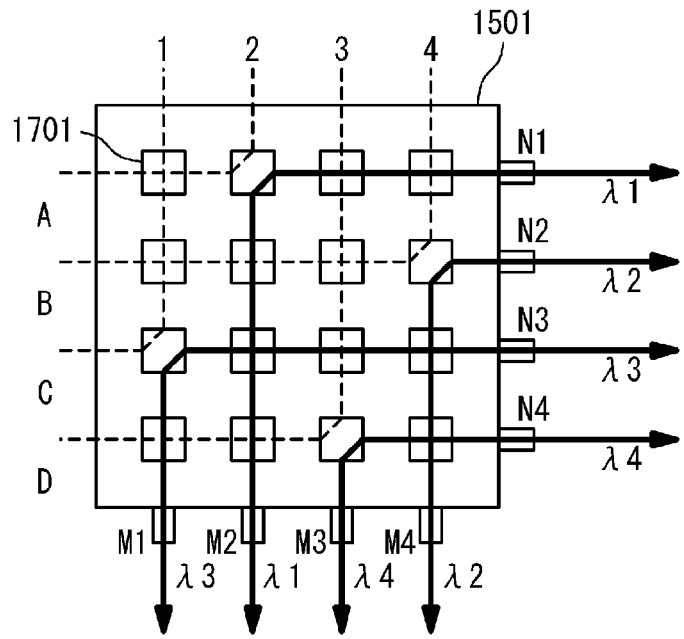
FIG. 3A shows a configuration of an optical matrix switch.
Figure 3B:
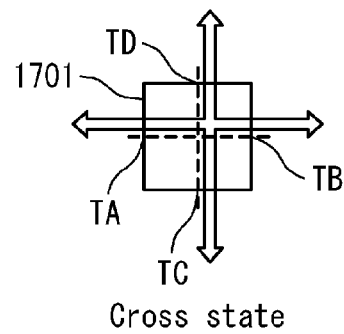
FIG. 3B shows the optical path of a crossbar switch element at the cross state.
Figure 3C:
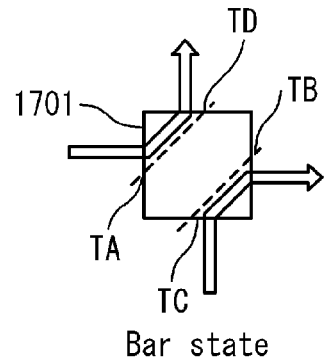
FIG. 3C shows the optical path of a crossbar switch element at the bar state.

The optical sending part 0103 is able to set the wavelength of a sending optical signal to any WDM signal wavelength by a wavelength variable function. The sending apparatus control part 0105 stores a correspondence relation between the demultiplexing ports P1 to P4 of the wavelength path multiplexing part 0102 and the multiplexing ports #1 to #4 respectively connected to the routes 1506 to 1509 for every wavelength as shown in FIG. 2B. The sending apparatus control part 0105 controls the sending optical wavelength set part 0104 and the selection wavelength control circuit 0106 in accordance with the setting of the route and the wavelength instructed by a signal from a higher apparatus.

The sending optical wavelength set part 0104 controls an indicated optical sending part 0103 to output an optical signal of an indicated wavelength in response to an instruction from the sending apparatus control part 0105.

The selection wavelength control circuit 0106 sets the wavelength of the wavelength path multiplexing or demultiplexing performed by an indicated wavelength selection multiplexing and demultiplexing element 0301 of the sending wavelength path selection part 0101 in response to an instruction signal from the sending apparatus control part 0105.

The receiving apparatus 0210 of the wavelength path multiplexing and demultiplexing optical transmission apparatus also has a similar configuration with the above receiving apparatus 0110. In the receiving apparatus 0210, an optical signal passes in the direction from the routes 1506 to 1509 to the transponder optical receiver 0203. However, the structural element corresponding to the optical sending wavelength set part 0104 is not required for the receiving apparatus 0110.

Figure 7A:
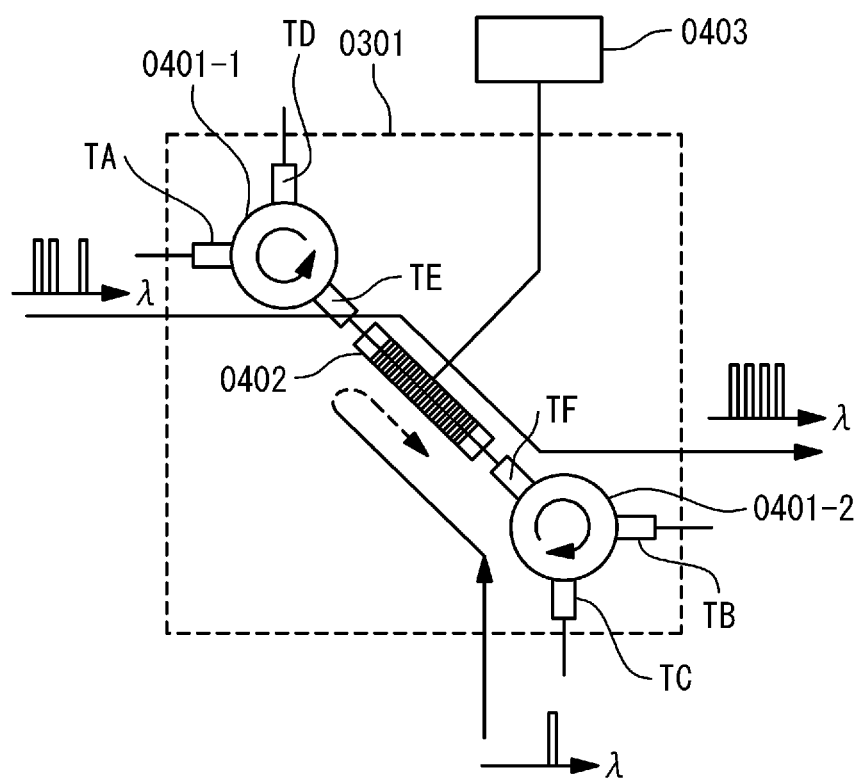
FIG. 7A shows a wavelength selection multiplexing and demultiplexing element.
Figure 7B:
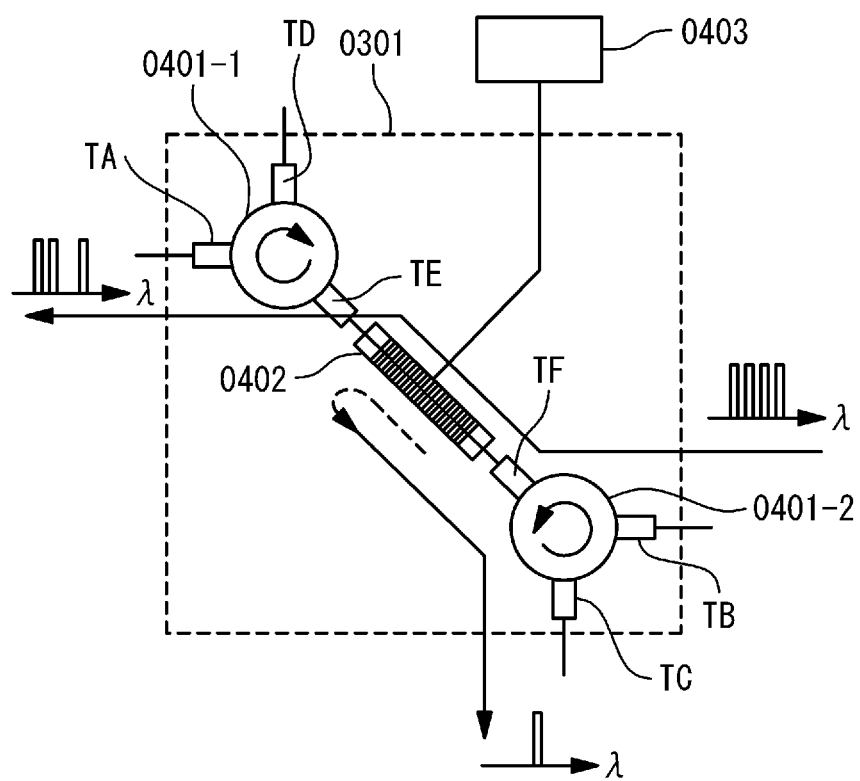
FIG. 7B shows a wavelength selection multiplexing and demultiplexing element.

A specific configuration of the wavelength selection multiplexing and demultiplexing element 0301 is explained below with reference to FIGS. 7A to 10B. FIGS. 7A and 7B show a wavelength selection multiplexing and demultiplexing element 0301 consisting of: optical circulators 0401-1, 0401-2; an optical fiber Bragg grating 0402; and an optical fiber Bragg grating multiplexing and demultiplexing wavelength control circuit 0403. In the optical circulator 401-1, an optical signal inputted to the input/output port TA is outputted to the input/output port TE. An optical signal inputted to the input/output port TE is outputted to the input/output port TD. An optical signal inputted to the input/output port TD is outputted to the input/output port TA. In the optical circulator 401-2, an optical signal inputted to the input/output port TB is outputted to the input/output port TC. An optical signal inputted to the input/output port TC is outputted to the input/output port TF. An optical signal inputted to the input/output port TF is outputted to the input/output port TB.

The optical fiber Bragg grating multiplexing and demultiplexing wavelength control circuit 0403 controls the optical fiber Bragg grating 0402 to reflect the optical signal inputted from the input/output port TF and having the wavelength λ being a target of adding or dropping in response to an instruction from a higher apparatus like a selection wavelength control circuit 0106.

FIG. 7A shows an add (wavelength multiplexing) operation. An optical signal inputted to the input/output port TA passes through an input/output port TE, an optical fiber Bragg grating 0402, and the optical circulator 0401-2, and is outputted from the input/output port TB. The optical signal of the wavelength λ inputted to the input/output port TC is outputted from the input/output port TF, is reflected at the optical fiber Bragg grating 0402 to input to the input/output port TF, and is outputted from the input/output port TB. By such an operation, an optical signal of the wavelength λ inputted from the input/output port TC is added to an optical signal inputted from the input/output port TA and outputted from the input/output port TB. In this case, the add state shown in FIG. 6C is realized.

FIG. 7B shows a drop (demultiplexing) operation. An optical signal inputted to the input/output port TB passes through an input/output port TF, an optical fiber Bragg grating 0402, and an optical circulator 0401-1, and is outputted from the input/output port TA. However, the optical signal of wavelength λ in an optical single inputted from the input/output port TB is reflected at the optical fiber Bragg grating 0402, is inputted from the input/output port TF to the optical circulator 0401, and is outputted from the input/output port TC. By such an operation, an optical signal of wavelength λ in the optical signal inputted from the input/output port TB is dropped to the input/output port TC. In this case, the drop state shown in FIG. 6D is realized.

When the optical fiber Bragg grating multiplexing and demultiplexing control circuit 0403 controls the optical fiber Bragg grating 0402 not to reflect an optical signal, an optical signal inputted to the input/output port TC is outputted to the input/output port TD. In this case, the cross state shown in FIG. 6B is realized.

Figure 8A:
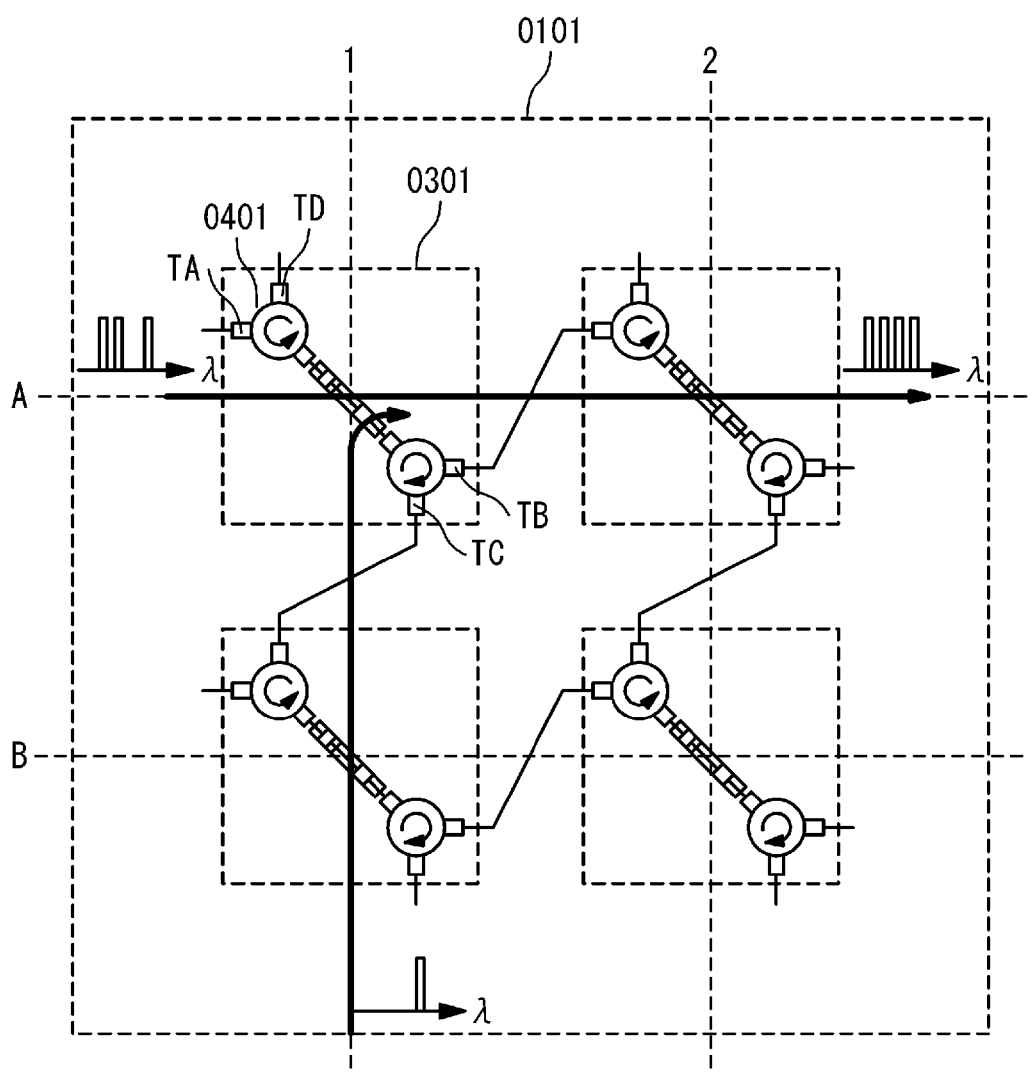
FIG. 8A shows a sending wavelength path selection part.
Figure 8B:
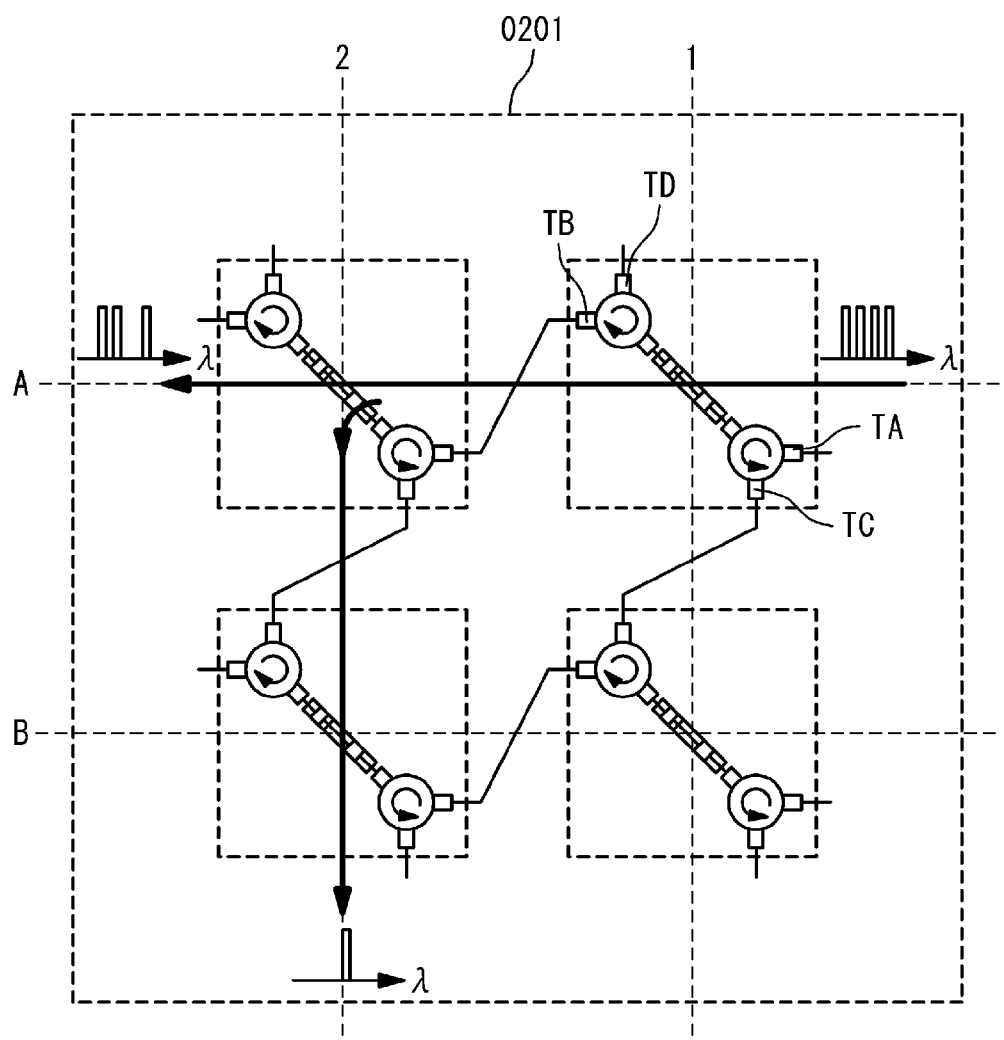
FIG. 8B shows a sending wavelength path selection part.

FIGS. 8A and 8B show a mutual connection relation between wavelength selection multiplexing and demultiplexing elements 0301 of the sending wavelength path selection part 0101 formed by connecting the wavelength selection multiplexing and demultiplexing elements shown in FIGS. 7A and 7B in a grid arrangement and a wavelength multiplexing and demultiplexing operation. Though a matrix arrangement of 2×2 is shown in this example, the number of constituents of the wavelength selection multiplexing and demultiplexing elements 0301 is not limited in principle.

FIG. 8A shows an add operation. Each wavelength selection multiplexing and demultiplexing element 0301 is set to: the cross state at the cross point B1; the add state of the wavelength λ at the cross point A1; and the cross state at the cross point A2. As a result, the optical signal of wavelength λ inputted to the input/output port TC at the cross point B1 is added to the optical signal inputted to the input/output port TA of the cross point A1 and outputted to the input/output port TB of the cross point A2. By this operation, it is possible to add an optical signal of any indicated wavelength inputted from the input/output port TC side (sending input ports M1 to M4 in FIG. 5) of the sending wavelength path selection part 0101 to any optical signal transmitted from the input/output port TA side.

FIG. 8B shows a drop operation. However, in this example, a receiving wavelength path selection part 0201 having a mirror image configuration whose left and right are reversed comparing with the sending wavelength path selection part 0101 shown in FIG. 8A. Therefore, the circulation direction of an optical signal in the optical circulator is drawn in the opposite to the case of FIG. 8A. Each wavelength selection multiplexing and demultiplexing element 0301 is set to: the cross state at the cross point A1; the drop state of wavelength λ at the cross point A2; and the cross state at the cross point B2. As a result, an optical signal of wavelength λ is dropped from the optical signal inputted from the input/output port TA at the cross point A1 and outputted from the input/output port TB at the cross point TB to the input/output port TC at the cross point B2. By such an operation, it is possible to drop an optical signal of any indicated wavelength from an optical signal inputted from the input/output port TA side (the receiving input ports R1 to R4) of the receiving wavelength path selection part 0201 and to drop the optical signal to the input/output port TC side (the receiving output ports S1 to S4 in FIG. 5).

Figure 9A:
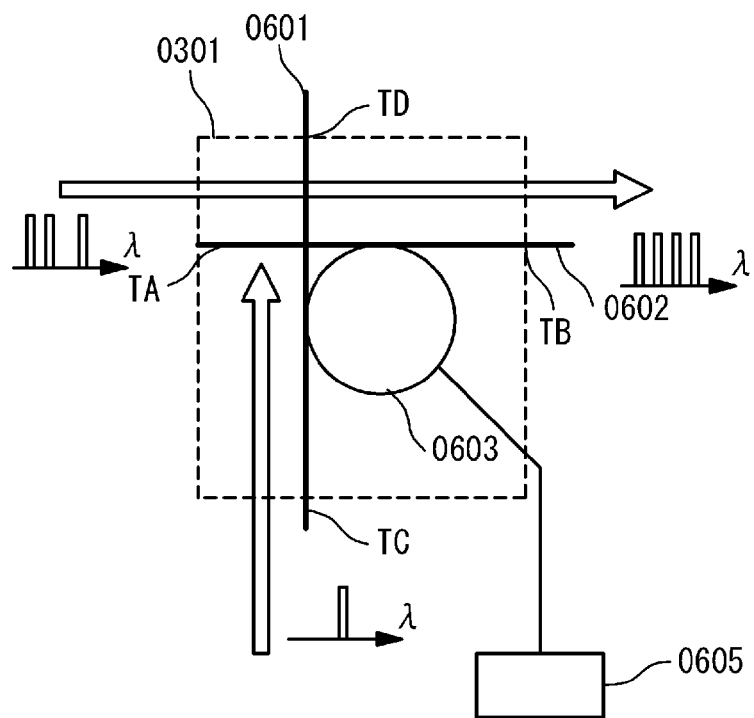
FIG. 9A shows a wavelength selection multiplexing and demultiplexing element.
Figure 9B:
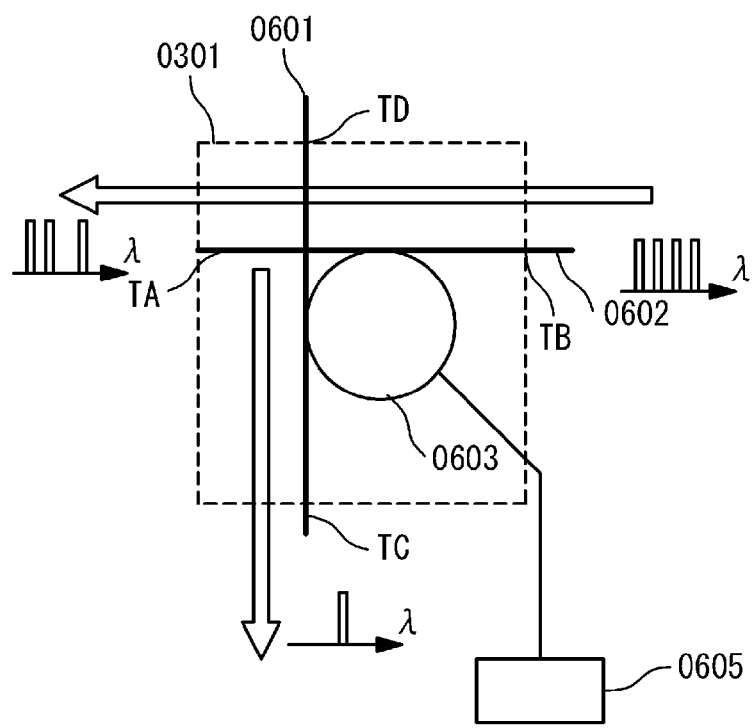
FIG. 9B shows a wavelength selection multiplexing and demultiplexing element.

FIGS. 9A and 9B are a wavelength selection multiplexing and demultiplexing element consisting of optical waveguides 0601, 0602, an optical waveguide ring oscillator 0603, and a ring oscillator multiplexing and demultiplexing wavelength control circuit 0605. The mutual connection relation between the wavelength selection multiplexing and demultiplexing elements and the operation of wavelength multiplexing and demultiplexing are the same to those of the case shown in FIGS. 8A and 8B.

Figure 10A:
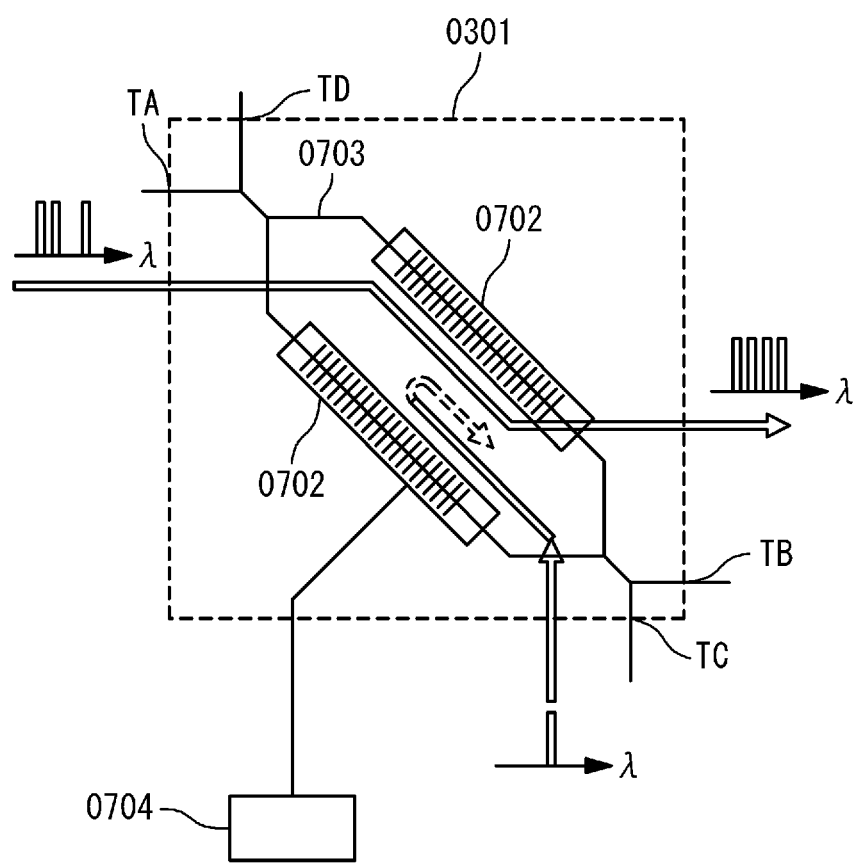
FIG. 10A shows a wavelength selection multiplexing and demultiplexing element.
Figure 10B:
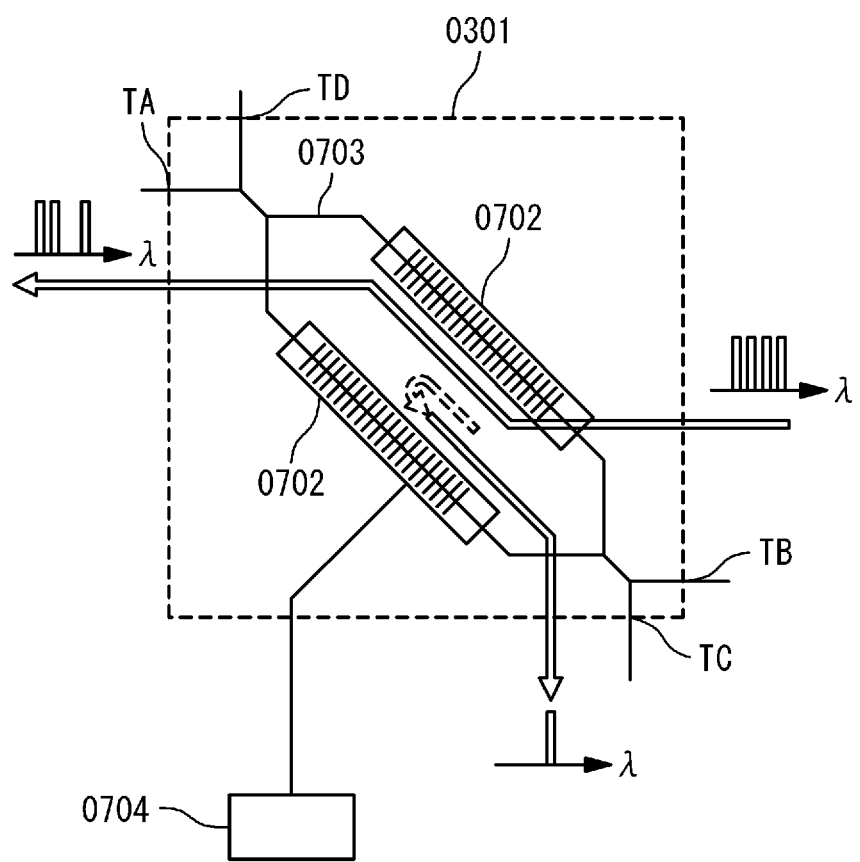
FIG. 10B shows a wavelength selection multiplexing and demultiplexing element.

FIGS. 10A and 10B show a wavelength selection multiplexing and demultiplexing element consisting of a waveguide grating 0702, a Mach-Zehnder type optical waveguide 0703, and a multiplexing and demultiplexing wavelength control circuit 0704. The mutual connection relation between the wavelength selection multiplexing and demultiplexing elements and the operation of wavelength multiplexing and demultiplexing are the same to those of the case shown in FIGS. 8A and AB.

Figure 11:
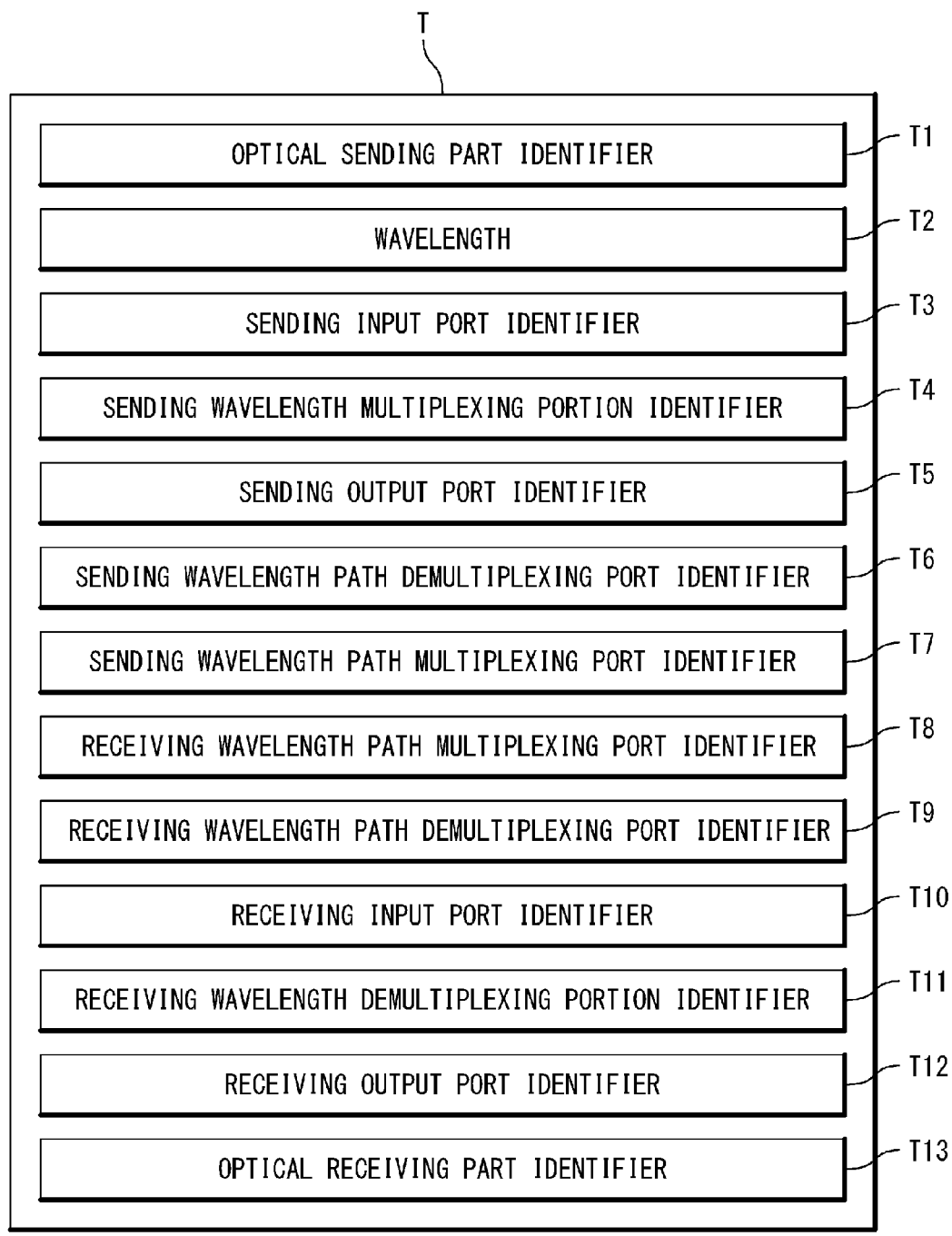
FIG. 11 shows data stored in the wavelength path management table.

FIG. 11 shows data stored in the wavelength path management table T. The sending apparatus control part 0105 has a storage part storing the wavelength path management table T. The wavelength path management table T stores an optical sending part identifier T1 which identifies each of the plurality of optical sending parts 0103 and a wavelength T2 which indicates the wavelength of the optical signal sent by the optical sending part. The wavelength path management table T further stores wavelength path information for identifying the path on which the optical signal sent from each optical sending part 0103 passes. The wavelength path information includes the following information:

(1) a sending input port identifier T3 which identifies the sending input ports M1 to M4;
(2) a sending wavelength multiplexing portion identifier T4 which indicates the portion of the wavelength selection multiplexing and demultiplexing element 0301 by which the optical signal inputted from each of the sending input ports M1 to M4 is multiplexed to the path directed to the sending output ports N1 to N4;
(3) a sending output port identifier T5 which identifies the sending output ports N1 to N4 by which an optical signal is outputted;
(4) a sending wavelength path demultiplexing port identifier T6 which identifies the input/output port of the input side of the wavelength path multiplexing part 0102;
(5) a sending wavelength path multiplexing port identifier T7 which identifies the sending wavelength path multiplexing ports #1 to #4 being input/output ports of the output side of the wavelength path multiplexing part 0102, the identifier T7 further identifies the routes 1506 to 1509 on which the optical signal passes;
(6) a receiving wavelength path multiplexing port identifier T8 which identifies the receiving wavelength path multiplexing ports #1 to #4 being input/output ports of the input side of the wavelength path demultiplexing part 0202;
(7) a receiving wavelength path demultiplexing port identifier T9 which identifies the receiving wavelength path demultiplexing ports Q1 to Q4 being input/output ports of the output side of the wavelength path demultiplexing part 0202;
(8) a receiving input port identifier T10 which identifies the receiving input ports R1 to R4;
(9) a receiving wavelength demultiplexing portion identifier T11 which identifies the portion of the wavelength selection multiplexing and demultiplexing element 0301 by which the optical signal inputted to each of the receiving input ports R1 to R4 is demultiplexed to the path directed to the receiving output ports S1 to S4;
(10) a receiving output port identifier T12 which identifies the receiving output ports S1 to S4; and
(11) an optical receiving part identifier T13 which identifies each of the plurality of optical receiving parts 0203.

The sending apparatus control part has a function to identify the wavelength of the optical signal in which a trouble occurs by referring to the wavelength path management table when a trouble occurs in the optical sending part 0103.

Explanation of Operation

An operation according to the present exemplary embodiment is explained by referring to FIG. 4. The operation for setting the wavelength path where the optical signal of wavelength λ1 is outputted to the sending wavelength path multiplexing port #1 connected to the route 1506 (hereinafter, it is called as the wavelength path of wavelength λ1-route #1) is explained. The sending apparatus control part 0105 specifies the transponder Y among the optical sending part 0103 in response to the wavelength path signal setting request of the wavelength λ1-route #1, and notifies the optical sending wavelength setting part 0104 to set the sending wavelength of the specified transponder Y to λ1.

The sending apparatus control part 0105 stores: a correspondence relation between the sending wavelength demultiplexing ports P1 to P4 of the wavelength path multiplexing part 0102 being a wavelength path multiplexing and demultiplexing circuit, the wavelengths λ1 to λ4, and the routes 1506 to 1509; and a connection relation between the transponders X to W being an optical sending part and the optical transmitter connection ports (the transponders X to W of the optical sending apparatus) of the sending input ports M1 to M4 of the sending wavelength path selection part 0101 in the wavelength path management table.

The sending apparatus control part 0105 notifies the wavelength selection multiplexing and demultiplexing elements 0301 at the cross points D2, C2, B2, A3 and A4 to set the cross state not to perform the multiplexing and to make all wavelength signals pass through. The sending apparatus control part 0105 further notifies the wavelength selection multiplexing and demultiplexing element 0301 at the cross point A2 to set the add state to multiplex the optical signal of wavelength λ1 inputted from the cross point B2 to the wavelength signal inputted from the cross point A1 (in this case, not exists). By the above operation, the wavelength signal of wavelength λ1 sent from the transponder Y is outputted to the sending wavelength path multiplexing port #2 connected to the route 1507.

Next, an operation for newly outputting the optical signal of wavelength λ2 to the sending wavelength path multiplexing port #2 connected to the route 1507 when the wavelengths λ1, λ2, λ3 and λ4 are preliminary set is explained. Similarly to the λ1, λ2, λ3, the wavelength path signal of wavelength λ2 outputted from the transponder W is inputted to the sending wavelength path selection part 0101. The sending optical wavelength setting part 0104 sets the sending wavelength path selection part 0101 such that the wavelength path signal passes the cross points D2, C2 and B2.

The sending optical wavelength setting part 0104 has already performed an operation setting of the wavelength selection multiplexing and demultiplexing element 0301 at the cross point A4 to make all wavelength path signals pass through. For outputting the optical signal of wavelength λ2 to the sending wavelength path multiplexing port #2 connected to the route 1507, it is required to input the optical signal to the sending wavelength path demultiplexing port P1 of the wavelength path multiplexing part 0102 to which a wavelength signal has already been inputted from FIGS. 2A and 2B. Therefore, the wavelength signal of wavelength λ2 from the cross point B4 is multiplexed to the wavelength signal inputted from the cross point A3 and outputted to the port of the wavelength path multiplexing part 0102 connected to the sending wavelength path demultiplexing port P1. The optical signals of wavelengths λ1, λ2 are both inputted to the sending wavelength path demultiplexing port P1 of the wavelength path multiplexing part 0102. The optical signals are outputted to each route based on the correspondence relation between the ports, wavelengths and routes shown in FIG. 2B. In this operation, in the optical signal of wavelength λ1, depending on the setting of the wavelength λ2, the deterioration of the communication quality caused by, for example, a mutual interference, is avoided.

The above operation is similar to the receiving apparatus 0210 of the wavelength path multiplexing and demultiplexing optical transmission apparatus except the wavelength setting operation. However, in the wavelength selection multiplexing and multiplexing element 0301, instead of the wavelength multiplexing operation of the above explanation, the wavelength demultiplexing operation is performed. At one wavelength selection multiplexing and demultiplexing element 0301, one wavelength is demultiplexed. However, the number of wavelengths of the wavelength signal of the passing side at the multiplexing and the demultiplexing may be plural.

In the present exemplary embodiment, the following effects can be achieved. At first, regarding the wavelength path sent to/received from the wavelength path multiplexing and demultiplexing optical transmission apparatus, it is possible to avoid a combination of the wavelength and the route which cannot be selected. The reason is that wavelength paths of a plurality of different wavelengths can be contained between the wavelength path selection part and the connection port of the wavelength path multiplexing part or the wavelength path demultiplexing part.

Second, the optical characteristics required for the wavelength multiplexing and demultiplexing element can be relaxed. The reason is as follows. In the present exemplary embodiment, the wavelength path multiplexing part or the wavelength path demultiplexing part and the wavelength path selection part are combined. The inter-ports relation between the wavelength demultiplexing port and the wavelength multiplexing port in the wavelength path multiplexing part or the wavelength path demultiplexing part is determined based on the wavelength of the wavelength path. Therefore, the variable range required for the wavelength multiplexing and demultiplexing element in the wavelength path selection part is limited to the inter-ports relation. As a result, the optical characteristics required for the wavelength multiplexing and demultiplexing element is relaxed.

A Second Exemplary Embodiment

Next, a second exemplary embodiment of the present invention is explained in detail with reference to the drawings. In the following, only the difference from the wavelength path multiplexing and demultiplexing optical transmission apparatus shown in the first exemplary embodiment will be explained.

Figure 12:
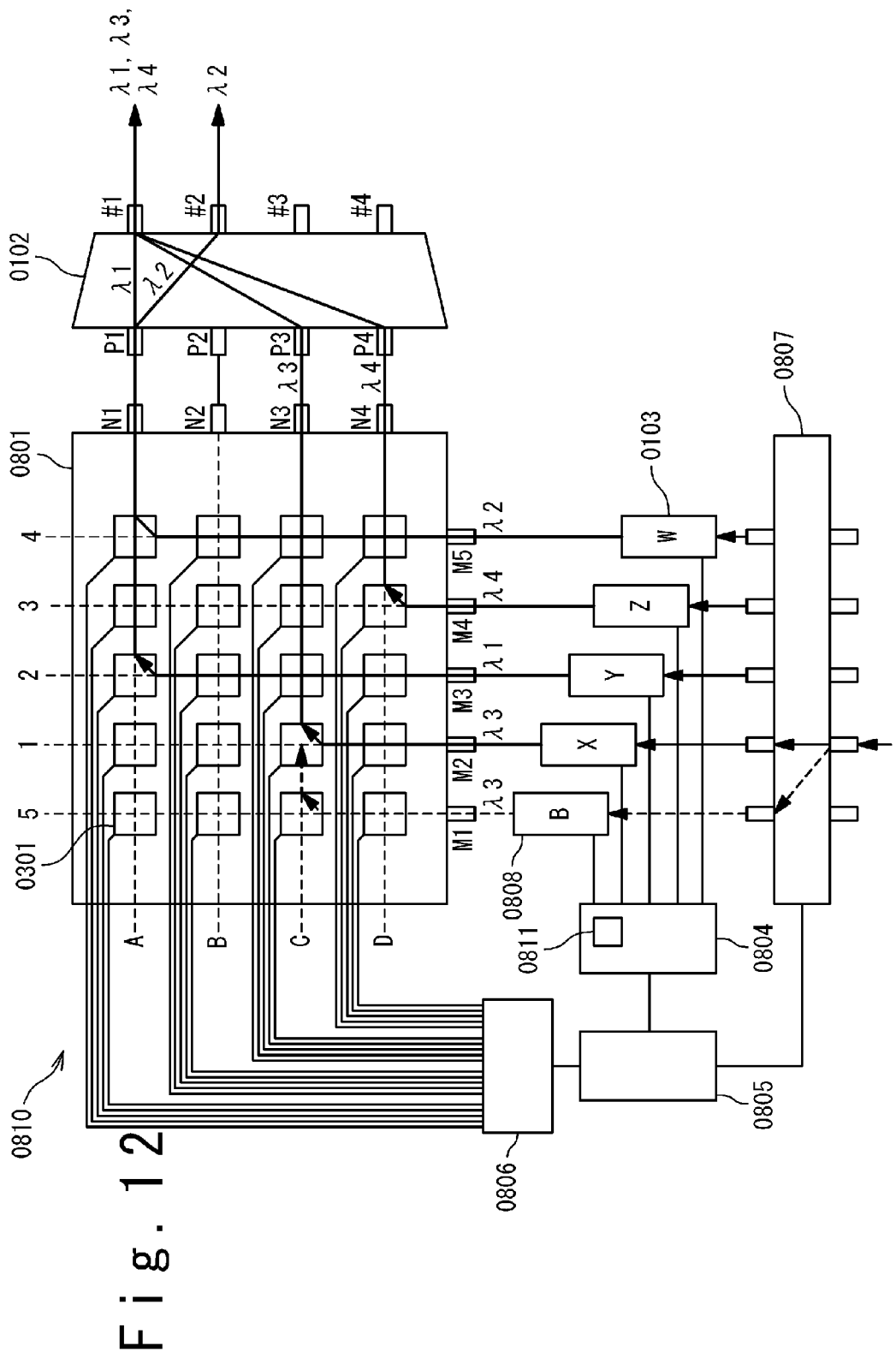
FIG. 12 shows a sending apparatus of the wavelength path multiplexing and demultiplexing optical transmission apparatus.

Referring to FIG. 12, a configuration and functional blocks of the wavelength path multiplexing and demultiplexing optical transmission apparatus according to the second exemplary embodiment of the present invention is explained. The sending wavelength path selection part 0801 has containing ports of the optical sending part 0103 whose number is larger than the sending wavelength path demultiplexing ports P1 to P4 of the wavelength path multiplexing port 0102. In the case of FIG. 12, 5 ports are allocated by adding 1 port to 4 ports. Note that the allocation number of the ports has no limitation.

In the sending wavelength path selection part 0801, 5×4=20 number of wavelength selection multiplexing and demultiplexing elements 0301 are disposed in a matrix arrangement and connected to each other to form a grid. To the added transponder optical transmitter containing port, a redundant system transponder 0808 is connected, and its sending wavelength is controlled by the sending optical wavelength setting part 0804. The selection wavelength control circuit 0806 includes a function to control the multiplexing and demultiplexing wavelength of the 20 number of wavelength selection multiplexing and demultiplexing elements 0301. The client optical signal selection circuit 0807 includes an optical trouble detection part 0811. The client optical signal selection circuit 0807 has a function to switch the connection between a plurality of working and redundant transponders and a client signal when the optical trouble detection part 0811 detects a trouble of an optical signal.

Figure 13:
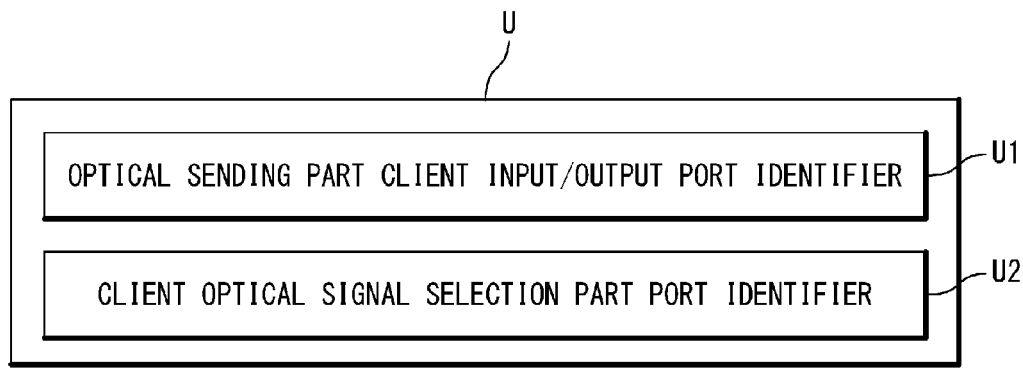
FIG. 13 shows a client connection table.

FIG. 13 shows a client connection table U. The sending apparatus control part 0805 stores a client connection table U. The client connection table U stores: an optical sending part client input/output port identifier U1 which identifies a connection terminal connected to the client optical signal selection circuit 0807 included in the optical sending part; and a client optical signal selection port identifier U2 which identifies an output terminal of the client optical signal selection circuit 0807 connected to that connection terminal.

Referring to FIG. 12, the operation of communication recovery by a redundant system transponder B when a trouble occurs in the working system transponder X is explained, in the sending apparatus 0801 of the wavelength path multiplexing and demultiplexing optical transmission apparatus according to the second exemplary embodiment of the present invention.

After a trouble occurs in the working system transponder X, the sending apparatus control part 0805 detects the trouble. The sending apparatus control part 0805 identifies the wavelength λ3 of the trouble sending optical signal being the optical signal outputted by the troubled working system transponder X by referring to the wavelength path management table T and investigating the wavelength T2 which corresponds to the optical sending part identifier T1 which identifies the troubled transponder.

The sending apparatus control part 0805 sets the sending wavelength to λ3 for the redundant system transponder B0808. At this time, the shutdown state (though the wavelength, sending optical power and the like are set, the sending wavelength signal is not outputted from the transponder) is set. At the same time, the sending apparatus control part 0805 notifies the client optical signal selection circuit 0807 to switch the output destination of the client signal from the troubled working system transponder to the redundant system transponder by referring to the client connection table U.

The sending apparatus control part 0805 obtains a sending wavelength multiplexing portion identifier T4 on an optical path of the troubled sending optical signal and a sending output port identifier T5 by obtaining information from the selection wavelength control circuit 0806 and stores them in the wavelength path management table T. As a result, the path D1-C1-C2-C3-C4 of the optical signal of the wavelength sent by the troubled working system transponder in the wavelength multiplexing part 0801 can be grasped.

The sending apparatus control part 0805 performs the switching operation by setting the wavelength multiplexing part 0801 such that the optical signal of wavelength λ3 sent by the redundant system transponder B0808 is inputted to the sending wavelength path demultiplexing port P3 of the wavelength path multiplexing part 102 based on the grasped path. Specifically, the wavelength selection multiplexing and demultiplexing element 0301 having a connectivity to the sending output port on the optical path of the troubled sending optical signal and also having a connectivity to the redundant system transponder being an optical sending part of the redundant system such that the optical signal of wavelength λ3 is added. By this operation, it becomes possible to send the optical signal of wavelength λ3 to the sending wavelength path demultiplexing port P3 continuously even after a trouble occurs. Further, by releasing the shutdown state of the redundant system transponder B, the communication by the working system transponder X before the trouble occurs is recovered.

Here, someone "has a connectivity" means the positional relation that the optical path is connected if the optical path is not changed at each wavelength selection multiplexing and demultiplexing element 0301, namely, if each wavelength selection multiplexing and demultiplexing element 0301 is set to the cross state.

The similar processing is also performed for the receiving apparatus when a trouble occurs. Namely, the receiving apparatus control part obtains the receiving wavelength demultiplexing portion identifier T11 on the troubled wavelength path and the receiving input port identifier T10 by obtaining information from the selection wavelength control circuit of the receiving side and stores them in the wavelength path management table T. As a result, the path of the optical signal of the wavelength sent by the troubled working system transponder in the wavelength multiplexing part can be grasped. The receiving apparatus control part performs a switching operation based on the grasped path. Specifically, the wavelength selection multiplexing and demultiplexing element 0301 at a cross point having a connectivity to the receiving input port on the troubled wavelength path and also having the redundant system transponder being an optical receiving part of the redundant system to demultiplex and drop the optical signal of wavelength λ3. Based on this operation, it becomes possible to receive the optical signal of wavelength λ3 continuously even after a trouble occurs.

As explained above, in the present exemplary embodiment, the wavelength multiplexing part 0801 is allocated with the sending input port M1 for containing the redundant system transponder and the wavelength selection multiplexing and demultiplexing element 0301. Further, the wavelength multiplexing part 0801 is allocated with the client optical signal selection circuit 0807 for switching the client connection of the transponder, so that it becomes possible to switch the operation of the working system transponder to the redundant system transponder when a trouble occurs, and as a result, the communication trouble can be recovered. Further, any number of optical transmitters, optical receivers or transponders of the redundant system can be allocated to a plurality of optical transmitters, optical receivers or transponders of the working system, so that the cost of the apparatus can be reduced.

A Third Exemplary Embodiment

Figure 14:
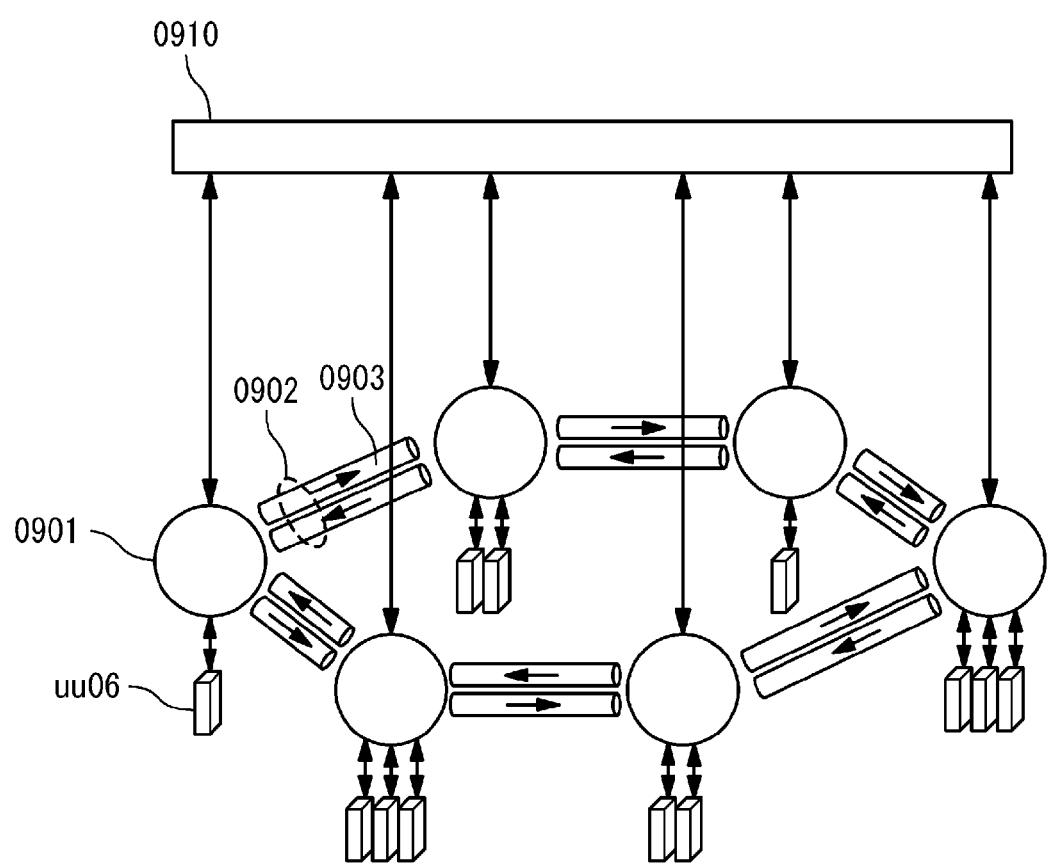
FIG. 14 shows a WDM wavelength network.
Figure 15:
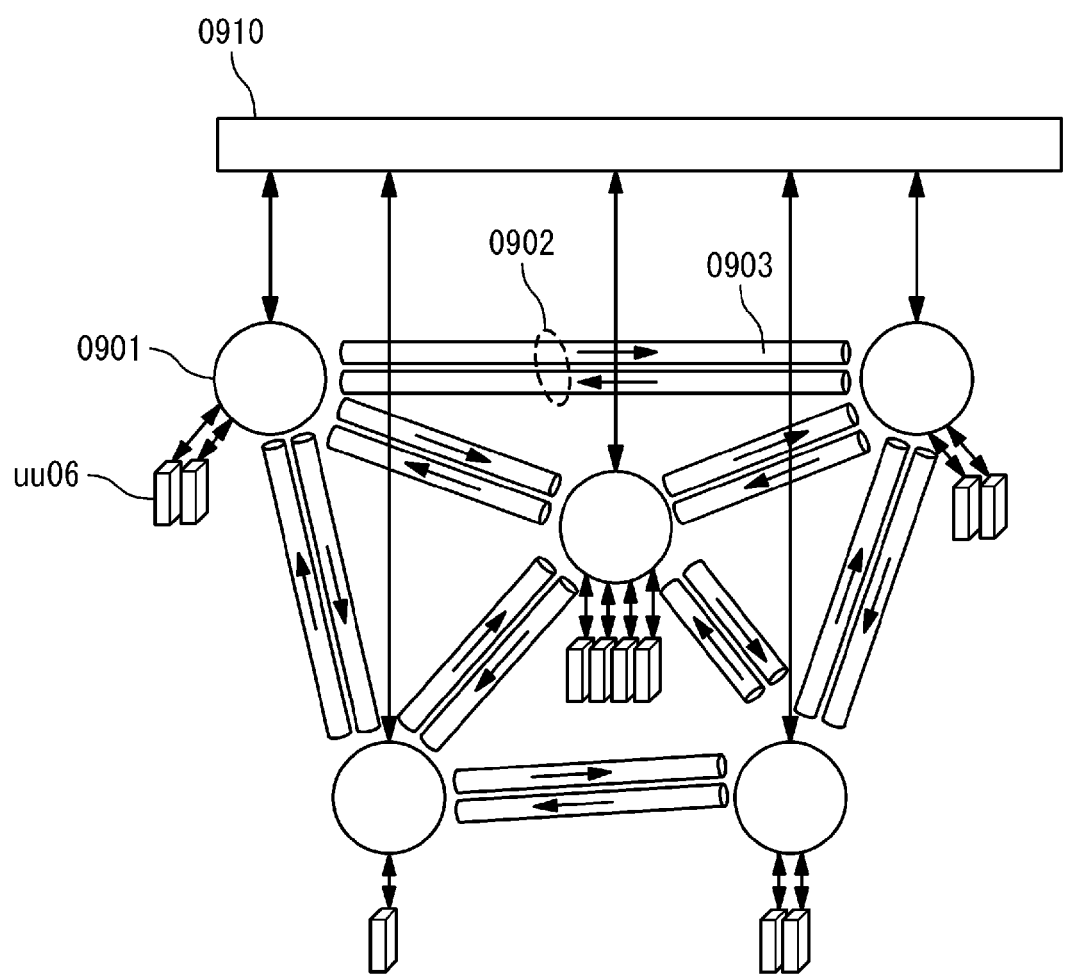
FIG. 15 shows a WDM wavelength network.

Next, a third exemplary embodiment of the present invention will be explained in detail with reference to the drawings. FIGS. 14 and 15 show a WDM wavelength network which is allocated with a plurality of wavelength path multiplexing and demultiplexing optical transmission apparatus according to the present invention. The WDM wavelength network includes: a wavelength network node 0901 having the Wavelength Cross-Connect-WXC function; a transponder uu06; an optical fiber 0903; a transmission path 0902; and a wavelength network management control apparatus 0910. Further, any other network topology than the ring topology shown in FIG. 14 and the mesh topology shown in FIG. 15 can be constructed.

Figure 18:
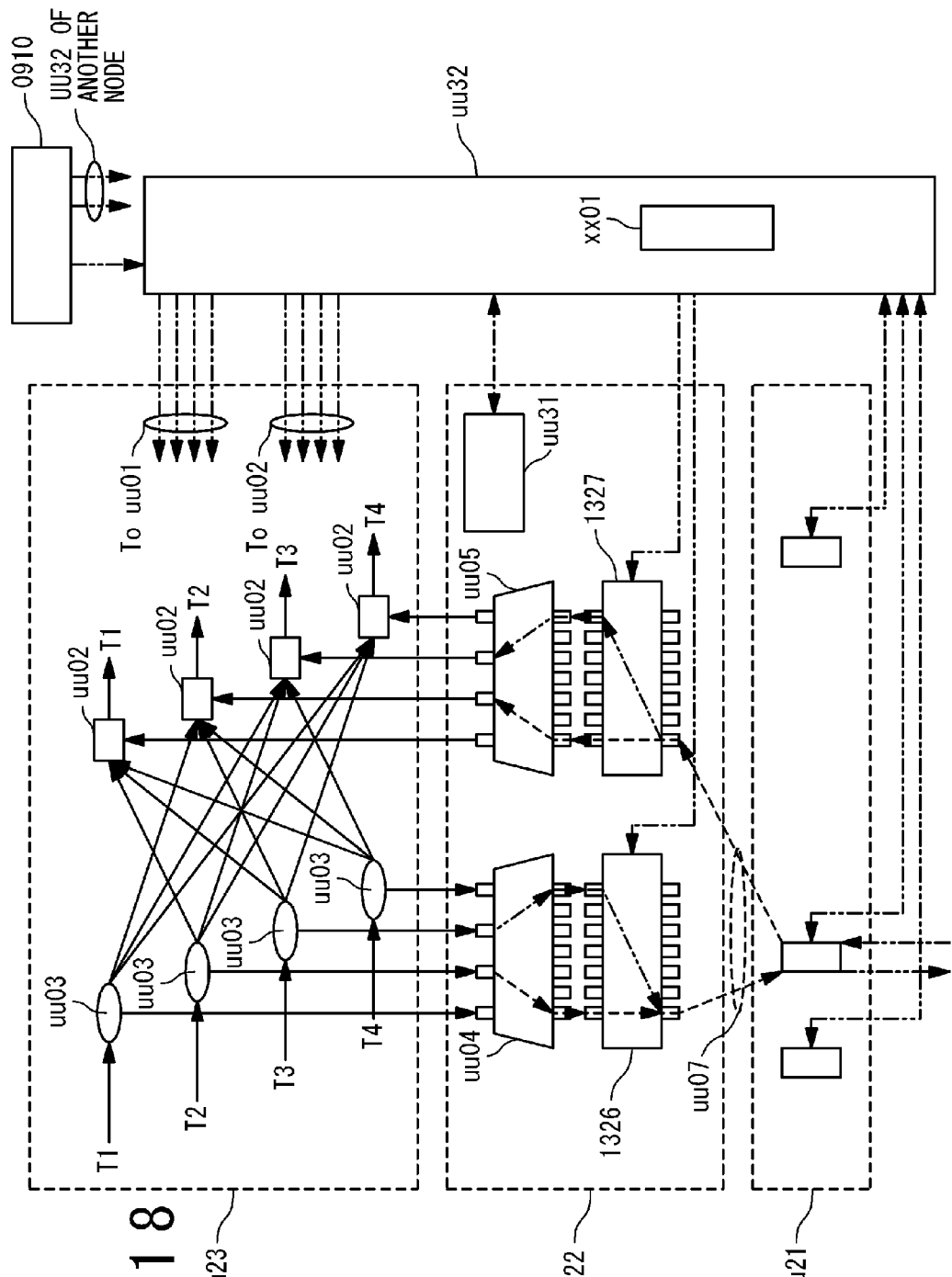
FIG. 18 shows a wavelength path multiplexing communication node apparatus.

FIG. 18 shows a configuration of a node having both of the sending side and the receiving side of the wavelength path multiplexing communication node apparatus according to the present exemplary embodiment. The WDM line part uu23 consists of an optical diverging coupler uu03 and a wavelength selection circuit uu02. The WDM line part uu23 has a function to output a wavelength signal which is introduced to and passes the own node to an appropriate route. The WDM line part uu23 performs multiplexing and demultiplexing between a signal of wavelength which is received or sent by the transponder allocated in the own node and the WDM line signal.

Figure 16:
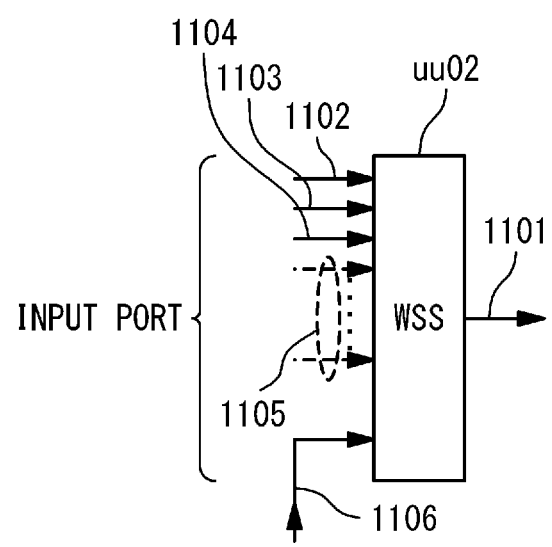
FIG. 16 shows an input/output interface of a wavelength selection circuit.
Figure 17:
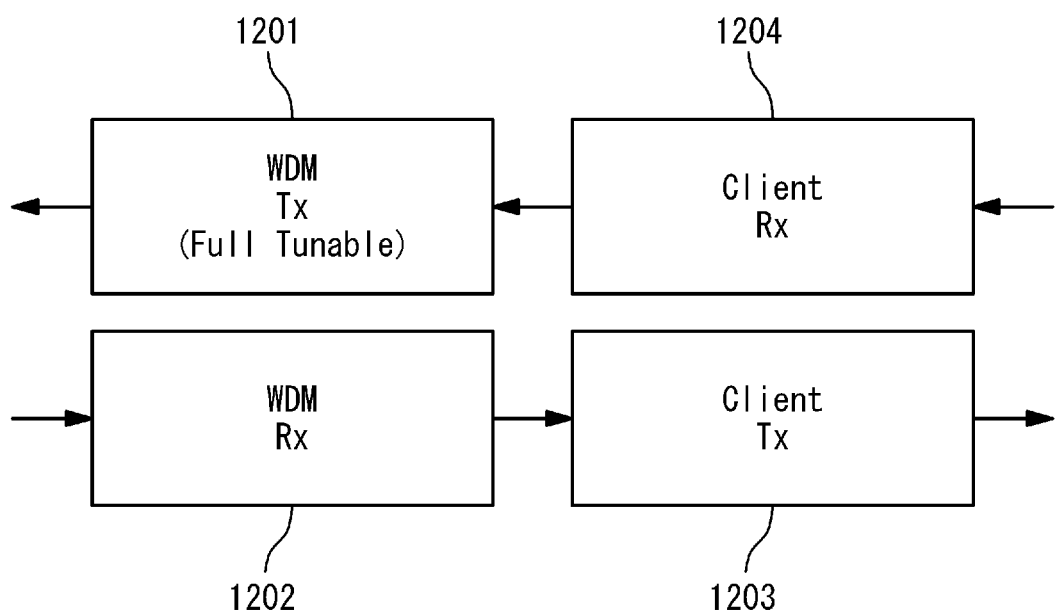
FIG. 17 shows an example of the configuration of a transponder.

FIG. 16 shows an input/output interface of the wavelength selection circuit uu02. It has: ports 1102 to 1104 for inputting a plurality of optical signals of any wavelength inputted from each transmission path; an input port 1105 for expanding a route; an adding input port 1106 for multiplexing by the transponder containing function part uu22 allocated in the own node; and an output port 1101 for selectively outputting an optical signal of any wavelength among all input signals.

The transponder containing function part uu22 and the transponder uu21 correspond to FIGS. 4 and 5 shown in the first exemplary embodiment of the present invention or FIG. 12 shown in the second exemplary embodiment of the present invention, and includes: wavelength path selection parts 1326, 1327; wavelength path multiplexing and demultiplexing circuits uu04, uu05; an optical sending wavelength setting part xx01; an optical path multiplexing and demultiplexing optical transmission apparatus control circuit uu32; and a selection wavelength control circuit uu31. The respective functions are as explained in the first and second exemplary embodiment of the present invention. The transponder uu21 includes: a full tunable wavelength variable optical transmitter 1201; an optical receiver 1202; a client signal processor and optical transmitter 1204; and a client signal processor and optical receiver 1203.

The operations in the present exemplary embodiment is similar to the operations already explained in the first or second exemplary embodiment of the present invention except that the control setting of the wavelength selection switch for the wavelength selection circuit uu02 of the WDM line part uu23 from the wavelength path multiplexing and demultiplexing optical transmission apparatus control circuit uu32 is required.

According to the configuration shown in the present exemplary embodiment, in any network topology having any number of wavelength network nodes, it becomes possible to set a path for a signal of any wavelength between any nodes.

A Fourth Exemplary Embodiment

Next, a fourth exemplary embodiment of the present invention is explained in detail with reference to the drawings. With reference to FIG. 19, an operation for changing the attribution of a wavelength path signal being a signal which transmits a wavelength path on which an optical signal of predetermined wavelength passes is explained. There are cases to change the wavelength path of the wavelength path signal by factors like a transmission path trouble, wavelength selection circuit trouble, and a reconfiguration request of a wavelength path. In FIG. 19, an opposing communication by the transponders 22 is performed between the Node-A and the Node-B. It is assumed that a trouble occurs on the transmission path T2 and it is switched to a path in another transmission path. In this case, the wavelength path of the redundant system to that of the working system is preliminary secured by a network control apparatus 0910 and the like, and the wavelength path of the redundant system is set to form a pair with the working system, or the wavelength path of the redundant system is set at the timing of a trouble detection by the network control apparatus 0910 and the like. Further, when other relay node apparatus not shown in drawings exists, the redundant system wavelength path is assumed to be similarly set by the network control apparatus 0910 and the like.

When a trouble occurs in a transmission path T2-λ2 between the Node-A and the Node-B, the transponder uu21 of the Node-B detects an alert of the LOS (Loss of Signal) of the wavelength path receiving signal or the like, and notifies the transponder uu21 of the Node-A of the occurrence of the trouble in the sending path through the opposing communication path. For example, in the case of the OTN frame based on ITU-T G.709, BDI (Backward Defect Indication) is the function corresponding to this notification. The wavelength path multiplexing communication node apparatus control circuit uu32 of the Node-A which recognized the above trouble occurrence recognizes that the redundant system wavelength path is set to the transmission path T3. Further, the wavelength path multiplexing communication node apparatus control circuit uu32 recognizes that the port which is able to output λ2 to the route T3 of the wavelength path multiplexing and demultiplexing circuit uu04 is P4, by referring to the correspondence relation between the input/output ports and the routes of the wavelength path multiplexing means shown in FIG. 2B. The wavelength path selection part 1326 of the Node-A controls the wavelength path selection part 1326 such that the wavelength path sending signal of the transponder uu21 is switched from the wavelength demultiplexing and multiplexing circuit port P1 to P4. The explanation of the operation of the control is same to that of the before-mentioned exemplary embodiments.

The transponder uu21 is switched to the wavelength path on the transmission path T3 in the state where the sending wavelength is λ2. On the other hand, the Node-B notifies the wavelength path multiplexing communication node apparatus control circuit uu32 of the LOS detection of the transponder uu21. The wavelength path multiplexing communication node apparatus control circuit uu32 identifies the output port of the wavelength path multiplexing and demultiplexing circuit uu05 which corresponds to the transmission path T3 being indicated as the redundant system and the wavelength λ2 as P4, by referring to the correspondence relation between the input/output ports and the routes of the wavelength path multiplexing means shown in FIG. 2B. Further, the wavelength path multiplexing communication node apparatus control circuit uu32 recognizes the port of the transponder uu21 which is connected to the transponder side of the wavelength path selection part 1327, and controls the wavelength path selection part 1327 to establish a connection to the wavelength path multiplexing and demultiplexing circuit port P4 of the wavelength path selection part 1327, in response to the LOS detection as a trigger.

In the above, a case where the wavelength does not change when the working system is switched to the redundant system is explained. However, in a case where the sending wavelength of the wavelength path is changed by a transponder, the operation is similarly performed. Further, in the present exemplary embodiment, the occurrence and the recovery of a trouble in the wavelength path is for only one direction, and at such a time, the opposing side continues an operation before the occurrence of the trouble. However, the path change may be applied to the opposing side. Moreover, in the present exemplary embodiment, a case of changing from the working system to the redundant system is explained. However, in a case where the working system continues to work and a transmission path is changed to another one or a wavelength is changed to another one, a similar operation can be applied by the network management control apparatus 0910. The configuration of the present exemplary embodiment can be applied to a trouble recovery of the wavelength network system, or the switching of the wavelength path associated with the wavelength path operation setting and changing.

This application is based upon and claims the benefit of priority from Japanese patent application No. 2009-082879, filed on Mar. 30, 2009, the disclosure of which is incorporated herein its entirety by reference.

What is claimed is:

1. A wavelength path multiplexing and demultiplexing optical transmission apparatus comprising:
   a sending apparatus; and
   a receiving apparatus,
   wherein the sending apparatus includes:
      a wavelength path multiplexing part;
      sending wavelength path selection part;
      an optical sending apparatus comprising a plurality of optical sending parts configured to send a plurality of optical signals having different wavelength from each other respectively;
      a sending apparatus control part;
      a sending selection wavelength control part; and
      a sending optical wavelength set part,
   and the wavelength path multiplexing part comprises:
      a plurality of sending wavelength path demultiplexing ports; and
      a plurality of sending wavelength path multiplexing ports with which a first correspondence relation indicating respective optical connections to the plurality of sending wavelength path demultiplexing ports are set, and the plurality of sending wavelength path multiplexing ports are respectively connected to a plurality of optical transmission paths,
   and the sending wavelength path selection part comprises:
      a plurality of sending input ports configured to respectively input a plurality of optical signals transmitted by the optical sending apparatus;
      a plurality of sending output ports configured to respectively output optical signals to the plurality of sending wavelength path demultiplexing port; and
      a wavelength multiplexing part configured to multiplex a set combination of a plurality of optical signals which input to the plurality of sending wavelength path demultiplexing ports to output to the plurality of sending output ports, and the receiving apparatus comprises:
  a wavelength path demultiplexing part;
  a receiving wavelength path selection part;
  an optical receiving apparatus having a plurality of optical receiving part configured to respectively receive a plurality of optical signals having different wavelengths to each other;
  a receiving apparatus control part; and
  a receiving selection wavelength control part, and the wavelength path demultiplexing part comprises:
  a plurality of receiving wavelength path multiplexing ports respectively connected to the plurality of optical transmission paths; and
  a plurality of receiving wavelength path demultiplexing port with which a second correspondence relation indicating respective optical connections to the plurality of receiving wavelength path multiplexing ports are set, and the receiving wavelength path selection part comprises:
  a plurality of receiving input ports configured to respectively input a plurality of optical signals outputted by the plurality of receiving wavelength path demultiplexing ports;
  a plurality of receiving output ports configured to respectively output a plurality of optical signals to the optical receiving apparatus; and
  a wavelength demultiplexing part configured to demultiplex a multiplexed optical signal among a plurality of optical signals respectively input to the plurality of receiving input ports to output to any of the plurality of receiving output ports, and the sending apparatus control part stores:
  first correspondence information which indicates a correspondence relation between the plurality of optical sending parts of the optical sending apparatus and the plurality of sending input ports;
  second correspondence information which indicates a connection relation between each of the plurality of sending output port and each of the plurality of sending wavelength path demultiplexing ports; and
  third correspondence information which indicates the first correspondence relation, the first correspondence relation being a one-to-one correspondence set to each wavelength of an optical signal inputted to each of the plurality of sending wavelength path demultiplexing port, and the sending selection wavelength control part is configured to multiplexing the set combination of the plurality of optical signals among a plurality of optical signals inputted to each of the plurality of sending input port by controlling an optical path of each of a plurality of wavelength multiplexing and demultiplexing elements included in the sending wavelength path selection part and arranged in array based on stored information, and the sending optical wavelength set part is configured to set a wavelength of an optical signal outputted by each of the plurality of optical sending part of the optical sending apparatus, and the receiving apparatus control part stores:
  fourth correspondence relation which indicates the second correspondence relation, the second correspondence relation being a one-to-one correspondence set to each wavelength of an optical signal inputted to each of the plurality of receiving wavelength path multiplexing port;
  fifth correspondence relation which indicates a correspondence relation between each of the plurality of receiving wavelength path demultiplexing port and each of the plurality of receiving input port; and
  sixth correspondence information which indicates a correspondence relation between the plurality of optical receiving parts of the optical receiving apparatus and the plurality of receiving output ports, and the receiving selection wavelength control part is configured to demultiplex a multiplexed optical signal inputted from the plurality of receiving wavelength path demultiplexing port by controlling an optical path of each of a plurality of wavelength demultiplexing elements included in the receiving wavelength path selection part and arranged in array based on stored information.

2. The wavelength path multiplexing and demultiplexing optical transmission apparatus according to claim 1, wherein the sending apparatus control part is configured to perform a setting operation to set: a wavelength path for transmitting a wavelength path signal being an optical signal outputted by the optical sending apparatus to the sending output port; and an output route for transmitting the wavelength path signal among the plurality of optical transmission paths, and in the setting operation, the sending apparatus control part is configured to:
  identify a wavelength path signal input port to which the wavelength path signal is inputted from the plurality of sending wavelength path demultiplexing port by referring to the third correspondence information;
  retrieving a sending multiplexing candidate wavelength multiplexing and demultiplexing element to which a wavelength multiplexing is not set among the plurality of wavelength multiplexing and demultiplexing elements included in the sending wavelength path selection part and having a connectivity to the wavelength path signal input port by referring to the second correspondence information;
  retrieving a connectable optical sending part having a connectivity to the sending multiplexing candidate wavelength multiplexing and demultiplexing element among the plurality of optical sending parts by referring to the first correspondence information; and
  determining a part which does not output an optical signal to the wavelength multiplexing part among the connectable optical sending part as a new set optical sending part, wherein the sending optical wavelength set part is configured to set the new set optical sending part to output an optical signal of a wavelength of the wavelength path signal, wherein the sending selection wavelength control part is configured to set a multiplexing wavelength of a wavelength multiplexing and demultiplexing element having a connectivity to the new set optical sending part among the plurality of wavelength multiplexing and demultiplexing elements to be a wavelength of the wavelength path signal, wherein in the setting operation, the receiving apparatus control part is configured to:
  identify a wavelength path single output port from which the wavelength path signal is outputted among the plurality of receiving wavelength path demultiplexing port by referring to the fourth correspondence information;

retrieving a receiving demultiplexing candidate wavelength multiplexing and demultiplexing element in which a wavelength demultiplexing is not set among the plurality of wavelength multiplexing and demultiplexing elements included in the receiving wavelength path selection part and having a connectivity to the wavelength path signal output port by referring to the fifth correspondence information;

retrieving a connectable optical receiving part having a connectivity to the receiving demultiplexing candidate wavelength multiplexing and demultiplexing element among the plurality of optical receiving part by referring to the sixth correspondence information;

determine a part to which an optical signal is not inputted from the wavelength demultiplexing part among the connectable optical receiving part as a new set optical receiving part;

wherein the receiving selection wavelength control part is configured to set a demultiplexing wavelength of a wavelength multiplexing and demultiplexing element among the plurality of wavelength multiplexing and demultiplexing elements and having a connectivity to the new set optical receiving part to be a wavelength of the wavelength path signal.

3. The wavelength path multiplexing and demultiplexing optical transmission apparatus according to claim 2, wherein the sending apparatus comprises:

a client optical signal selection part which includes a plurality of output terminals configured to supply a plurality of client optical signals to the plurality of optical sending part respectively; and an optical trouble detection part configured to detect a trouble of each of the plurality of optical sending part, wherein the client optical signal selection part is configured to perform a switch operation to switch a destination of a client optical signal from the optical sending part of a working system among the plurality of optical sending part to the optical sending part of a redundant system among the plurality of optical sending part when an occurrence of a trouble is detected in the optical sending part of the working system by the optical trouble detection part.

4. The wavelength path multiplexing and demultiplexing optical transmission apparatus according to claim 3, wherein the sending apparatus control part stores a wavelength path management table which stores a correspondence between an identifier identifying each of the plurality of optical sending part and a wavelength of a sending optical signal, and the sending apparatus control part is configured to identify a wavelength of the optical sending part of the working system in which a trouble occurs as a trouble occurrence wavelength by referring to the wavelength path management table, wherein the wavelength path multiplexing sending control part is configured to set a wavelength of an optical signal outputted from the optical sending part of the redundant system to the trouble occurrence wavelength.

5. The wavelength path multiplexing and demultiplexing optical transmission apparatus according to claim 4, wherein the sending apparatus control part further stores a client connection table which stores a connection relation between each of the plurality of output terminals of the client optical signal selection part and each of the plurality of optical sending part, wherein the switching operation is performed by referring to the client connection table.

6. The wavelength path multiplexing and demultiplexing optical transmission apparatus according to claim 5, wherein the wavelength path management table, with a connection between an identifier identifying each of the plurality of optical sending parts, further stores:

wavelength multiplexing portion identifying information which identifies a wavelength multiplexing and demultiplexing element to which a wavelength multiplexing is set among the plurality of wavelength multiplexing and demultiplexing elements in the sending wavelength path selection part on an optical path of an optical signal sent by each of the plurality of optical sending parts; and a sending output port among the plurality of sending output ports which exists on an optical path of an optical signal sent by each of the plurality of optical sending parts, wherein the sending apparatus control part is, when an occurrence of a trouble in an optical sending part of a working system among the plurality of optical sending parts is detected by the optical sending part trouble detection part, by referring to the wavelength path management table, configured to identify:

the optical sending part of the working system in which a trouble occurs;

a wavelength of a trouble sending optical signal being an optical signal outputted by the optical sending part of the working system;

a multiplexing wavelength multiplexing and demultiplexing element among the plurality of wavelength multiplexing and demultiplexing elements included in the wavelength multiplexing part which performs a multiplexing operation of adding the trouble sending optical signal to an optical path going to the wavelength path multiplexing part; and a sending output port among the plurality of sending output ports which exists on an optical path of the trouble sending optical signal, wherein the sending apparatus control part is configured to set a wavelength multiplexing and demultiplexing element among the plurality of wavelength multiplexing and demultiplexing elements which has a connectivity to the sending output port on an optical path of the trouble sending optical signal and has a connectivity to the optical sending part of the redundant system to perform a wavelength multiplexing at a wavelength of an optical signal outputted by the optical sending part of the working system when the switching operation is performed.

7. The wavelength path multiplexing and demultiplexing optical transmission apparatus according to claim 6, further comprising an optical receiver trouble detection part configured to detect a trouble of each of the plurality of optical receiving part, wherein the wavelength path management table further stores a connection between:

an identifier identifying each of the plurality of optical receiving part;

a wavelength of a receiving optical signal;

wavelength demultiplexing portion identification information identifying a wavelength multiplexing and demultiplexing element which is set to perform a wavelength demultiplexing among the plurality of wavelength multiplexing and demultiplexing elements in the receiving wavelength path selection part on an optical path of an optical signal received by the plurality of optical receiving part; and a receiving input port on an optical path of an optical signal received by each of the plurality of optical receiving parts among the plurality of receiving input port, wherein the receiving apparatus control part is, by referring to the wavelength path management table when the optical receiver trouble detection part detects an occurrence of a trouble in the optical receiving part of the working system among the plurality of optical receiving parts, configured to identify:

the optical receiving part of the working system in which a trouble occurs;

a wavelength of a trouble receiving optical signal being an optical signal received by the optical receiving part of the working system;

a demultiplexing wavelength multiplexing and demultiplexing element among the plurality of wavelength multiplexing and demultiplexing elements included in the wavelength demultiplexing part which performs a demultiplexing operation of dropping the trouble receiving optical signal from an optical path coming from the wavelength path demultiplexing part; and a receiving input port which exists on an optical path of the trouble receiving optical signal among the plurality of receiving input ports, wherein the receiving apparatus control part is configured to set a wavelength multiplexing and demultiplexing element among the plurality of wavelength multiplexing and demultiplexing elements having a connectivity to the receiving input port on an optical path of the trouble receiving optical signal and has a connectivity to the optical receiving part of the redundant system to perform a wavelength demultiplexing by a wavelength of an optical signal outputted by the optical receiving part of the working system.

8. The wavelength path multiplexing and demultiplexing optical transmission apparatus according to claim 1, wherein the wavelength path multiplexing and demultiplexing optical transmission apparatus is arranged at each of the plurality of nodes forming a wavelength path network system, wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node, wherein an optical apparatus, being any of an optical transmitter, an optical receiver, and an optical transponder, is arranged in each of the plurality of nodes, wherein the wavelength path connects the optical apparatus of a first node being any of the plurality of nodes and the optical apparatus of a second node being any node connected to the first node in communicable bi-directionally, and wherein each of the plurality of nodes comprises:
a wavelength distribution part which comprises an optical power diverging part configured to output, by diverging all wavelengths inputted from an input transmission path among the plurality of wavelength path multiplexing optical transmission path to the own node,
a passing optical signal sent to all wavelength path multiplexing transmission path among the plurality of wavelength path multiplexing transmission path connected to the own node except the input transmission path, and
an optical signal to the wavelength path demultiplexing part included in the wavelength path multiplexing and demultiplexing apparatus in the own node; and
a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

9. A wavelength multiplexing optical transmission apparatus, comprising:

a wavelength path multiplexing part;
sending wavelength path selection part;
an optical sending apparatus that comprises a plurality of optical sending parts configured to send a plurality of optical signals having different wavelength from each other respectively;
a sending apparatus control part;
a sending selection wavelength control part; and
a sending optical wavelength set part,
wherein the wavelength path multiplexing part comprises:
a plurality of sending wavelength path demultiplexing ports; and
a plurality of sending wavelength path multiplexing ports with which a first correspondence relation indicating respective optical connections to the plurality of sending wavelength path demultiplexing ports are set,
wherein the plurality of sending wavelength path multiplexing ports are respectively connected to a plurality of optical transmission paths,
wherein the sending wavelength path selection part comprises:
a plurality of sending input ports configured to respectively input a plurality of optical signals transmitted by the optical sending apparatus;
a plurality of sending output ports configured to respectively output optical signals to the plurality of sending wavelength path demultiplexing port; and
a wavelength multiplexing part configured to multiplex a set combination of a plurality of optical signals which input to the plurality of sending wavelength path demultiplexing ports to output to the plurality of sending output ports,
wherein the sending apparatus control part stores:
first correspondence information which indicates a correspondence relation between the plurality of optical sending parts of the optical sending apparatus and the plurality of sending input ports;
second correspondence information which indicates a connection relation between each of the plurality of sending output port and each of the plurality of sending wavelength path demultiplexing ports; and
third correspondence information which indicates the first correspondence relation, the first correspondence relation being a one-to-one correspondence set to each wavelength of an optical signal inputted to each of the plurality of sending wavelength path demultiplexing port,
wherein the sending selection wavelength control part is configured to multiplexing the set combination of the plurality of optical signals among a plurality of optical signals inputted to each of the plurality of sending input port by controlling an optical path of each of a plurality of wavelength multiplexing and demultiplexing elements included in the sending wavelength path selection part and arranged in array based on stored information, and wherein the sending optical wavelength set part is configured to set a wavelength of an optical signal outputted by each of the plurality of optical sending part of the optical sending apparatus.

10. A wavelength path demultiplexing optical transmission apparatus, comprising:
   a wavelength path demultiplexing part;
   a receiving wavelength path selection part;
   an optical receiving apparatus having a plurality of optical receiving part configured to respectively receive a plurality of optical signals having different wavelengths to each other;
   a receiving apparatus control part; and
   a receiving selection wavelength control part,
   wherein the wavelength path demultiplexing part comprises:
      a plurality of receiving wavelength path multiplexing ports respectively connected to the plurality of optical transmission paths; and
      a plurality of receiving wavelength path demultiplexing port with which a second correspondence relation indicating respective optical connections to the plurality of receiving wavelength path multiplexing ports are set,
   wherein the receiving wavelength path selection part comprises:
      a plurality of receiving input ports configured to respectively input a plurality of optical signals outputted by the plurality of receiving wavelength path demultiplexing ports;
      a plurality of receiving output ports configured to respectively output a plurality of optical signals to the optical receiving apparatus; and
      a wavelength demultiplexing part configured to demultiplex a multiplexed optical signal among a plurality of optical signals respectively input to the plurality of receiving input ports to output to any of the plurality of receiving output ports,
   wherein the receiving apparatus control part stores:
      fourth correspondence relation which indicates the second correspondence relation, the second correspondence relation being a one-to-one correspondence set to each wavelength of an optical signal inputted to each of the plurality of receiving wavelength path multiplexing port;
      fifth correspondence relation which indicates a correspondence relation between each of the plurality of receiving wavelength path demultiplexing port and each of the plurality of receiving input port; and
      sixth correspondence information which indicates a correspondence relation between the plurality of optical receiving parts of the optical receiving apparatus and the plurality of receiving output ports, and
   wherein the receiving selection wavelength control part is configured to demultiplex a multiplexed optical signal inputted from the plurality of receiving wavelength path demultiplexing port by controlling an optical path of each of a plurality of wavelength demultiplexing elements included in the receiving wavelength path selection part and arranged in array based on stored information.

11. The wavelength path multiplexing and demultiplexing optical transmission apparatus according to claim 2,
   wherein the wavelength path multiplexing and demultiplexing optical transmission apparatus is arranged at each of the plurality of nodes forming a wavelength path network system,
   wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node,
   wherein an optical apparatus, being any of an optical transmitter, an optical receiver, and an optical transponder, is arranged in each of the plurality of nodes,
   wherein the wavelength path connects the optical apparatus of a first node being any of the plurality of nodes and the optical apparatus of a second node being any node connected to the first node in communicable bi-directionally, and
   wherein each of the plurality of nodes comprises:
      a wavelength distribution part which comprises an optical power diverging part configured to output, by diverging all wavelengths inputted from an input transmission path among the plurality of wavelength path multiplexing optical transmission path to the own node,
         a passing optical signal sent to all wavelength path multiplexing transmission path among the plurality of wavelength path multiplexing transmission path connected to the own node except the input transmission path, and
         an optical signal to the wavelength path demultiplexing part included in the wavelength path multiplexing and demultiplexing apparatus in the own node; and
      a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

12. The wavelength path multiplexing and demultiplexing optical transmission apparatus according to claim 3,
   wherein the wavelength path multiplexing and demultiplexing optical transmission apparatus is arranged at each of the plurality of nodes forming a wavelength path network system,
   wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node,
   wherein an optical apparatus, being any of an optical transmitter, an optical receiver, and an optical transponder, is arranged in each of the plurality of nodes,
   wherein the wavelength path connects the optical apparatus of a first node being any of the plurality of nodes and the optical apparatus of a second node being any node connected to the first node in communicable bi-directionally, and wherein each of the plurality of nodes comprises:
a wavelength distribution part which comprises an optical power diverging part configured to output, by diverging all wavelengths inputted from an input transmission path among the plurality of wavelength path multiplexing optical transmission path to the own node,
a passing optical signal sent to all wavelength path multiplexing transmission path among the plurality of wavelength path multiplexing transmission path connected to the own node except the input transmission path, and
an optical signal to the wavelength path demultiplexing part included in the wavelength path multiplexing and demultiplexing apparatus in the own node; and
a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

13. The wavelength path multiplexing and demultiplexing optical transmission apparatus according to claim 4,
wherein the wavelength path multiplexing and demultiplexing optical transmission apparatus is arranged at each of the plurality of nodes forming a wavelength path network system,
wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node,
wherein an optical apparatus, being any of an optical transmitter, an optical receiver, and an optical transponder, is arranged in each of the plurality of nodes,
wherein the wavelength path connects the optical apparatus of a first node being any of the plurality of nodes and the optical apparatus of a second node being any node connected to the first node in communicable bi-directionally, and
wherein each of the plurality of nodes comprises:
a wavelength distribution part which comprises an optical power diverging part configured to output, by diverging all wavelengths inputted from an input transmission path among the plurality of wavelength path multiplexing optical transmission path to the own node,
a passing optical signal sent to all wavelength path multiplexing transmission path among the plurality of wavelength path multiplexing transmission path connected to the own node except the input transmission path, and
an optical signal to the wavelength path demultiplexing part included in the wavelength path multiplexing and demultiplexing apparatus in the own node; and
a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

14. The wavelength path multiplexing and demultiplexing optical transmission apparatus according to claim 5,
wherein the wavelength path multiplexing and demultiplexing optical transmission apparatus is arranged at each of the plurality of nodes forming a wavelength path network system,
wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node,
wherein an optical apparatus, being any of an optical transmitter, an optical receiver, and an optical transponder, is arranged in each of the plurality of nodes,
wherein the wavelength path connects the optical apparatus of a first node being any of the plurality of nodes and the optical apparatus of a second node being any node connected to the first node in communicable bi-directionally, and
wherein each of the plurality of nodes comprises:
a wavelength distribution part which comprises an optical power diverging part configured to output, by diverging all wavelengths inputted from an input transmission path among the plurality of wavelength path multiplexing optical transmission path to the own node,
a passing optical signal sent to all wavelength path multiplexing transmission path among the plurality of wavelength path multiplexing transmission path connected to the own node except the input transmission path, and
an optical signal to the wavelength path demultiplexing part included in the wavelength path multiplexing and demultiplexing apparatus in the own node; and
a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

15. The wavelength path multiplexing and demultiplexing optical transmission apparatus according to claim 6,
wherein the wavelength path multiplexing and demultiplexing optical transmission apparatus is arranged at each of the plurality of nodes forming a wavelength path network system,
wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node,
wherein an optical apparatus, being any of an optical transmitter, an optical receiver, and an optical transponder, is arranged in each of the plurality of nodes, wherein the wavelength path connects the optical apparatus of a first node being any of the plurality of nodes and the optical apparatus of a second node being any node connected to the first node in communicable bi-directionally, and wherein each of the plurality of nodes comprises:

a wavelength distribution part which comprises an optical power diverging part configured to output, by diverging all wavelengths inputted from an input transmission path among the plurality of wavelength path multiplexing optical transmission path to the own node, a passing optical signal sent to all wavelength path multiplexing transmission path among the plurality of wavelength path multiplexing transmission path connected to the own node except the input transmission path, and an optical signal to the wavelength path demultiplexing part included in the wavelength path multiplexing and demultiplexing apparatus in the own node; and a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

16. The wavelength path multiplexing and demultiplexing optical transmission apparatus according to claim 7, wherein the wavelength path multiplexing and demultiplexing optical transmission apparatus is arranged at each of the plurality of nodes forming a wavelength path network system, wherein the plurality of nodes are connected to each other via a plurality of wavelength path multiplexing transmission paths, and each of the plurality of nodes is configured to multiplexing or demultiplexing a wavelength path to a wavelength path multiplexing transmission path among the plurality of wavelength path multiplexing transmission path and being connected to an own node, wherein an optical apparatus, being any of an optical transmitter, an optical receiver, and an optical transponder, is arranged in each of the plurality of nodes, wherein the wavelength path connects the optical apparatus of a first node being any of the plurality of nodes and the optical apparatus of a second node being any node connected to the first node in communicable bi-directionally, and wherein each of the plurality of nodes comprises:

a wavelength distribution part which comprises an optical power diverging part configured to output, by diverging all wavelengths inputted from an input transmission path among the plurality of wavelength path multiplexing optical transmission path to the own node, a passing optical signal sent to all wavelength path multiplexing transmission path among the plurality of wavelength path multiplexing transmission path connected to the own node except the input transmission path, and an optical signal to the wavelength path demultiplexing part included in the wavelength path multiplexing and demultiplexing apparatus in the own node; and a wavelength selection switching part configured to select an optical signal sent to each of all wavelength path multiplexing transmission path among the plurality of wavelength path multiplexing transmission path and connected to the own node except the input transmission path, among the passing optical signal and an optical signal outputted by the wavelength path multiplexing part in the own node.

* * * * *